United States Patent [19]
Zalenski

[11] Patent Number: 5,194,699
[45] Date of Patent: Mar. 16, 1993

[54] DIGITIZER TABLET WITH FIXED INCREMENTED GRID PORTIONS

[75] Inventor: Thomas C. Zalenski, Prospect, Conn.

[73] Assignee: Summagraphics Corporation, Seymour, Conn.

[21] Appl. No.: 649,435

[22] Filed: Feb. 1, 1991

Related U.S. Application Data

[63] Continuation-in-part of Ser. No. 503,537, Apr. 3, 1990, Pat. No. 4,996,393, and Ser. No. 612,530, Nov. 13, 1990, Pat. No. 5,006,833.

[51] Int. Cl.[5] .............................................. G08C 21/00
[52] U.S. Cl. ..................................................... 178/19
[58] Field of Search .................................... 178/19, 18

[56] References Cited

U.S. PATENT DOCUMENTS

| | | | |
|---|---|---|---|
| 4,029,899 | 6/1977 | Gordon | 178/19 |
| 4,088,842 | 5/1978 | Ikedo | 178/19 |
| 4,213,005 | 7/1980 | Cameron | 178/18 |
| 4,260,852 | 4/1981 | Fencl | 178/19 |
| 4,423,286 | 12/1983 | Bergeron | 178/19 |
| 4,554,409 | 11/1985 | Mitsui et al. | 178/19 |
| 4,616,107 | 10/1986 | Abe et al. | 178/18 |
| 4,694,124 | 9/1987 | Blesser | 178/19 |
| 4,734,546 | 3/1988 | Landmeier | 178/19 |
| 4,794,209 | 12/1988 | Asada et al. | 178/19 |
| 4,806,918 | 2/1989 | Berke et al. | 340/712 |
| 4,835,347 | 5/1989 | Watson | 178/19 |
| 4,855,538 | 8/1989 | Jacob-Grinschgl et al. | 178/19 |

FOREIGN PATENT DOCUMENTS 1440130 11/1972 United Kingdom.

Primary Examiner—Stafford D. Schreyer
Attorney, Agent, or Firm—Rosen, Dainow & Jacobs

[57] ABSTRACT

An electromagnetic digitizer tablet comprising an array of conductors having plural, spaced, similar active portions regularly and uniformly distributed throughout the active tablet region, together with additional structure to distinguish pointing device positions over the similar active portions. This arrangement reduces the number of individual conductors required. In a preferred arrangement, the active portions have a block S shape. As a further feature, novel algorithms are used to calculate the fine location of the pointing device.

29 Claims, 16 Drawing Sheets

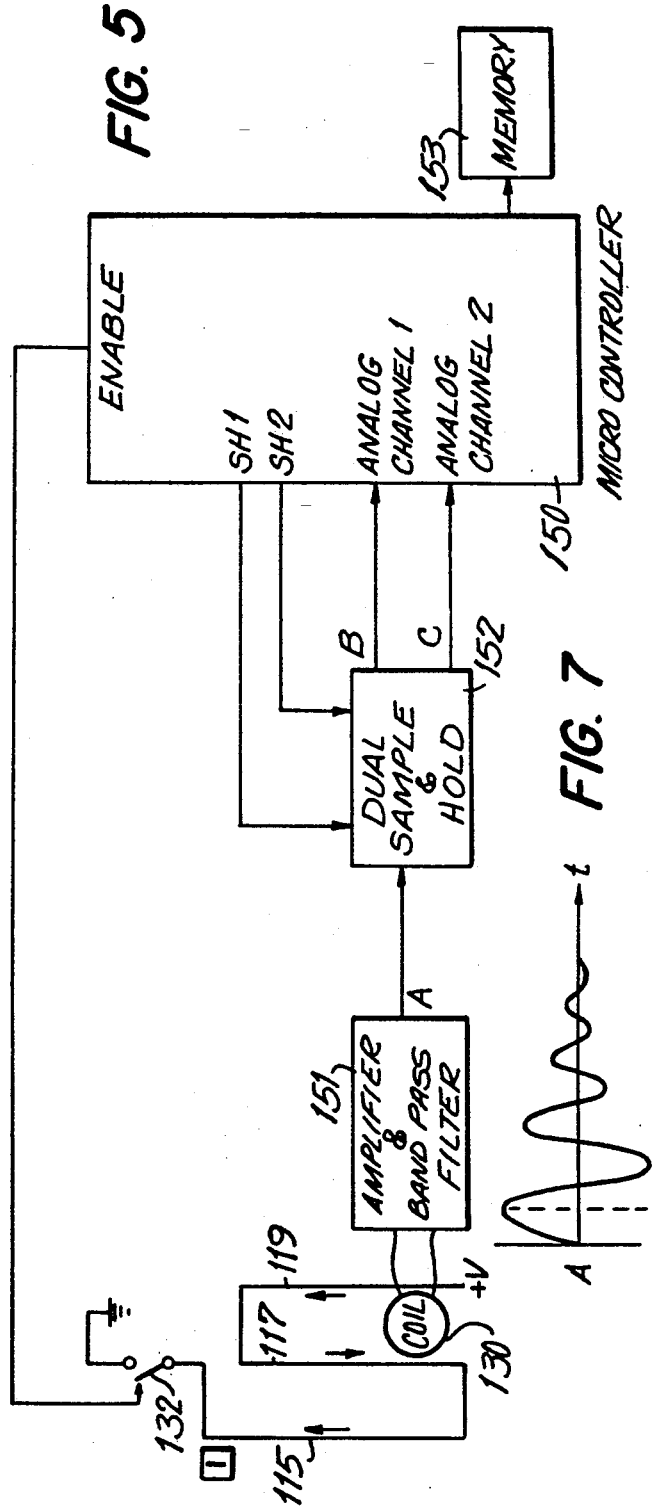

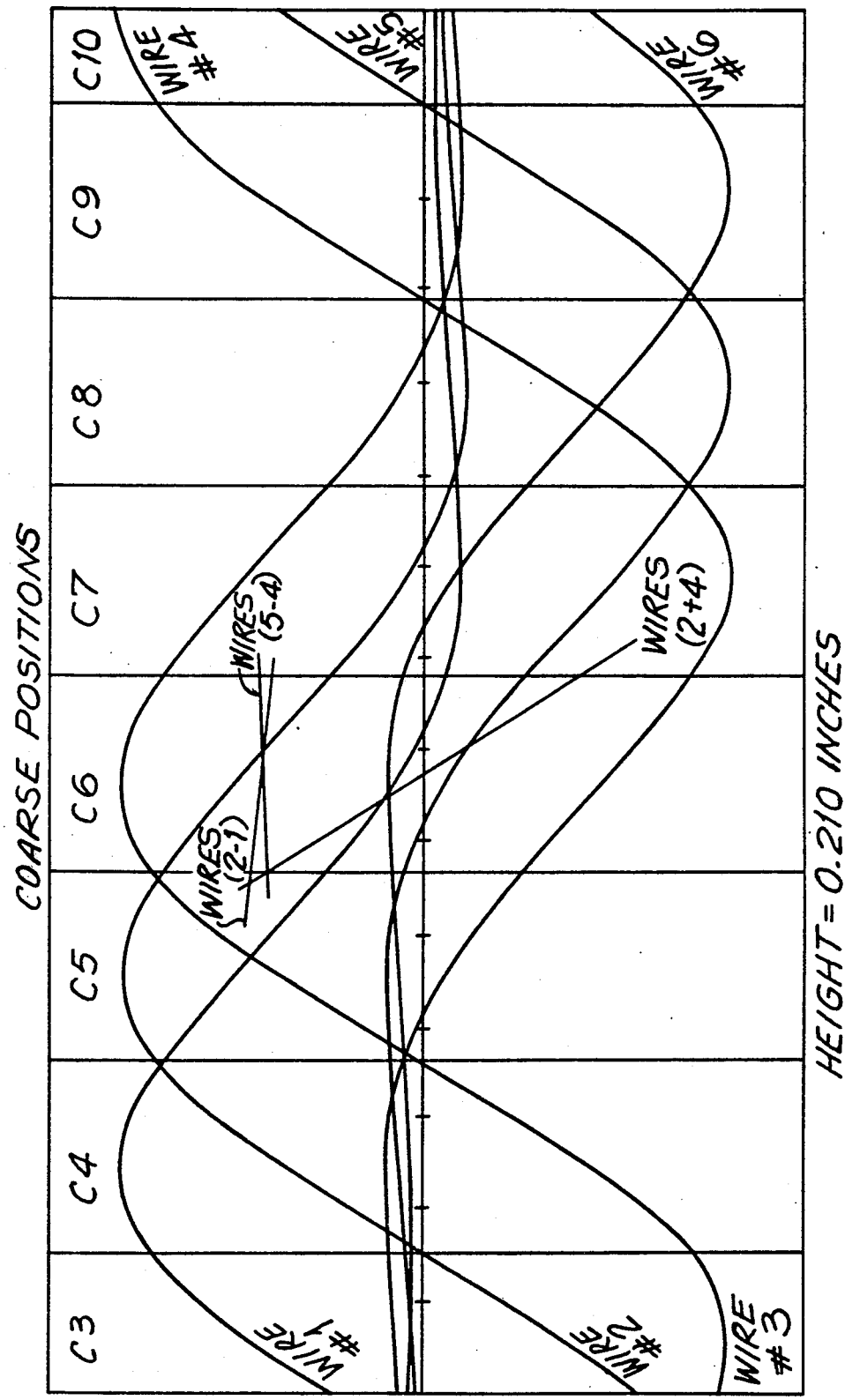

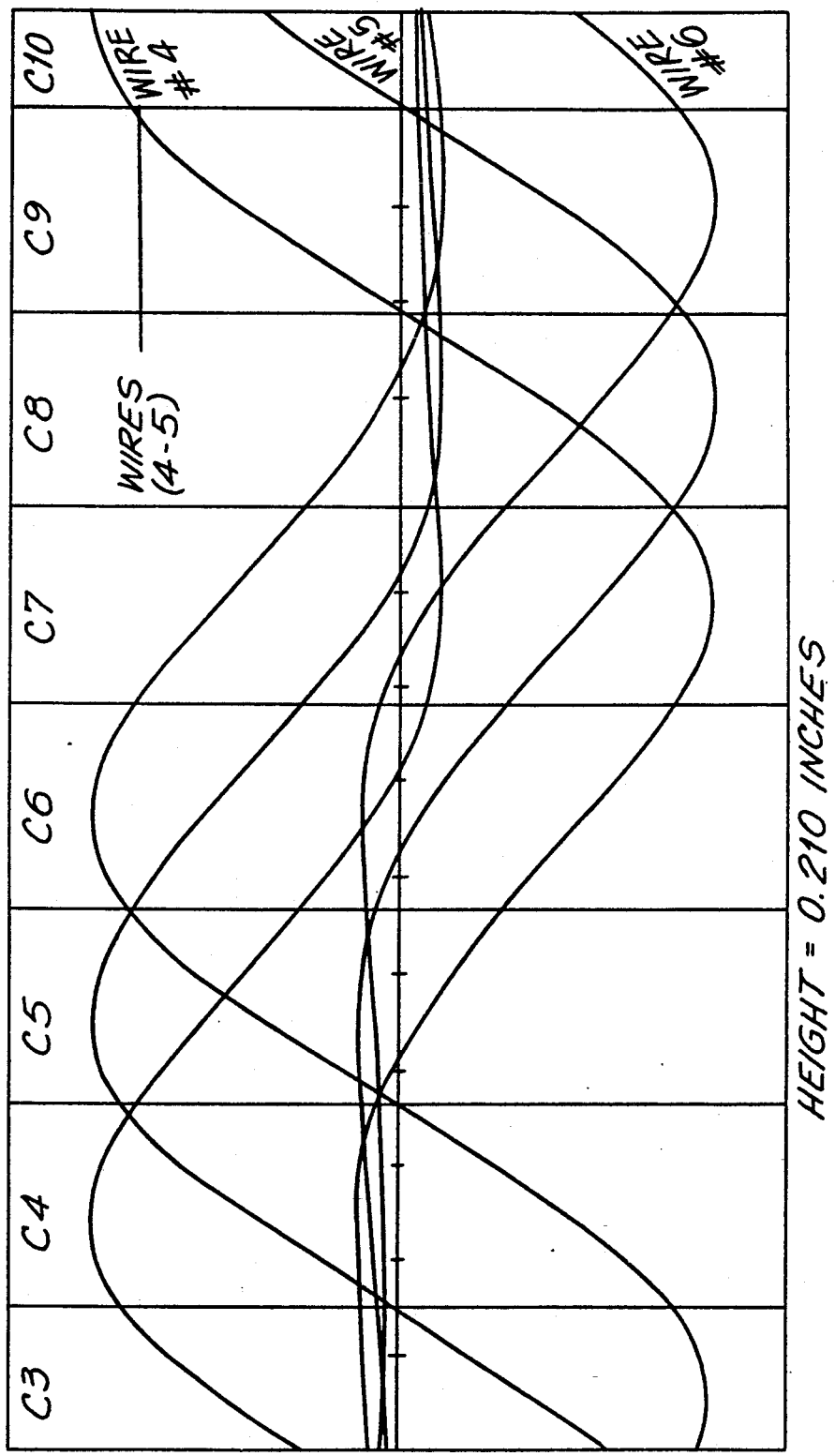

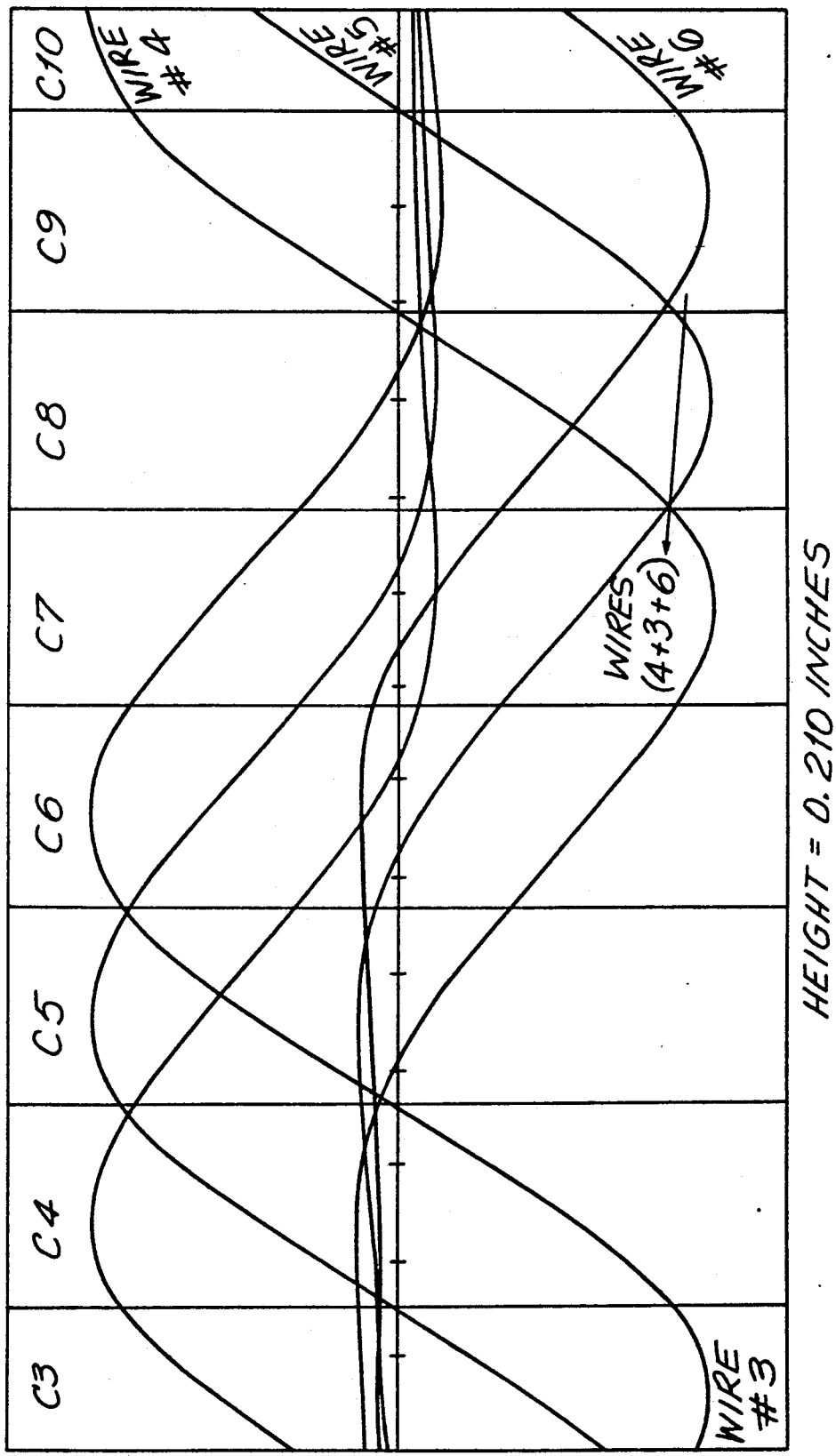

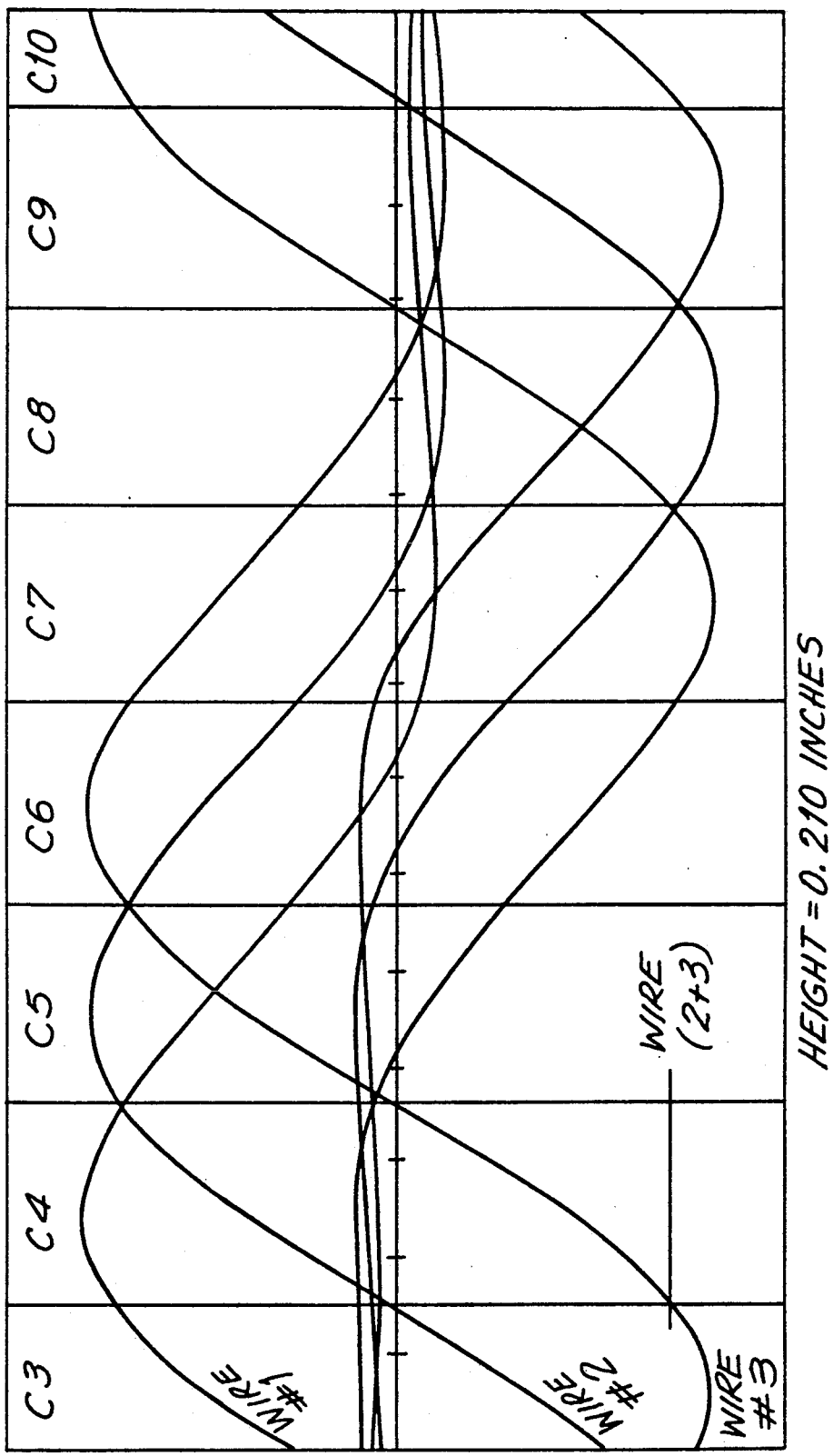
FIG. 10D (FORMULA SET #4)

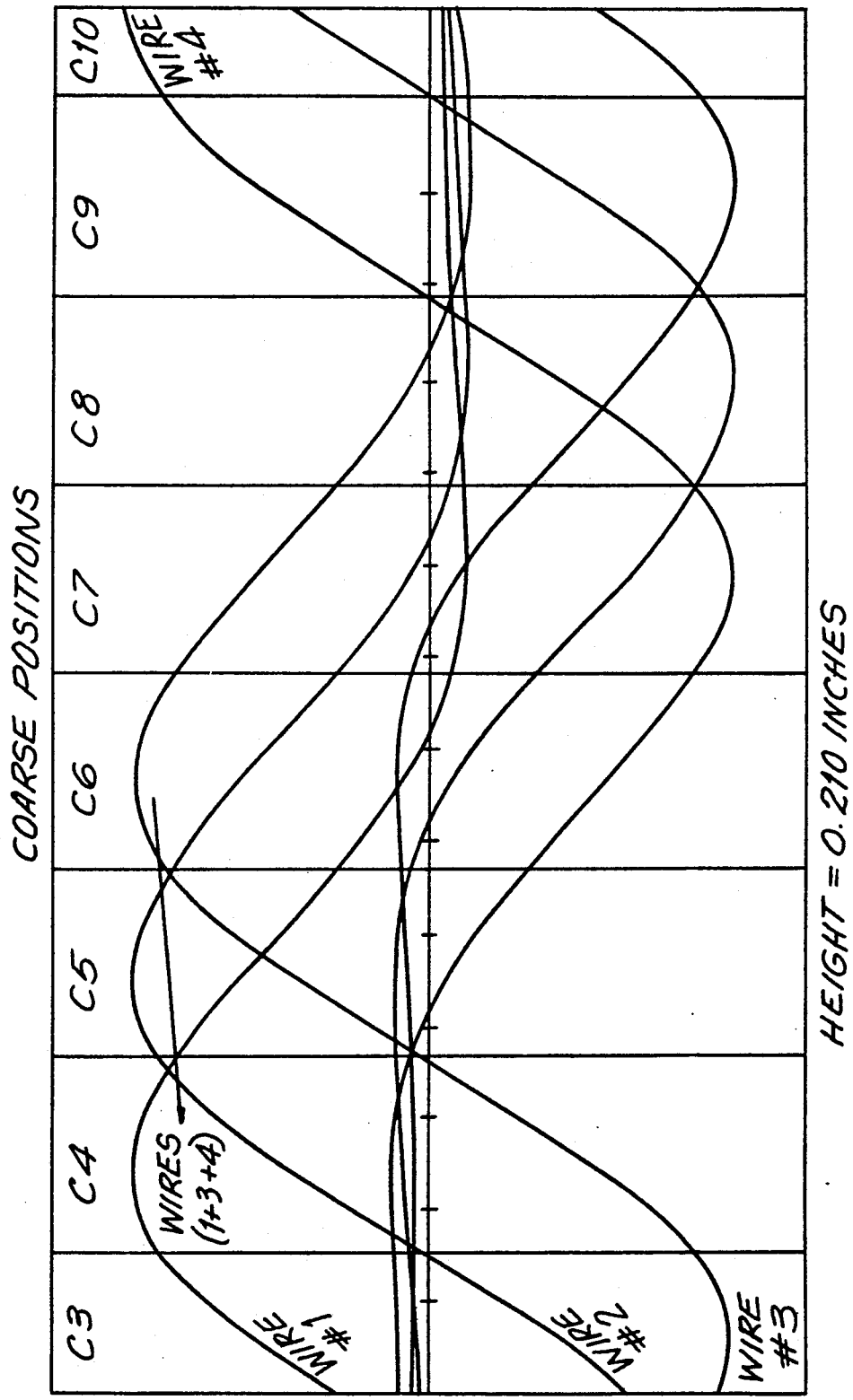

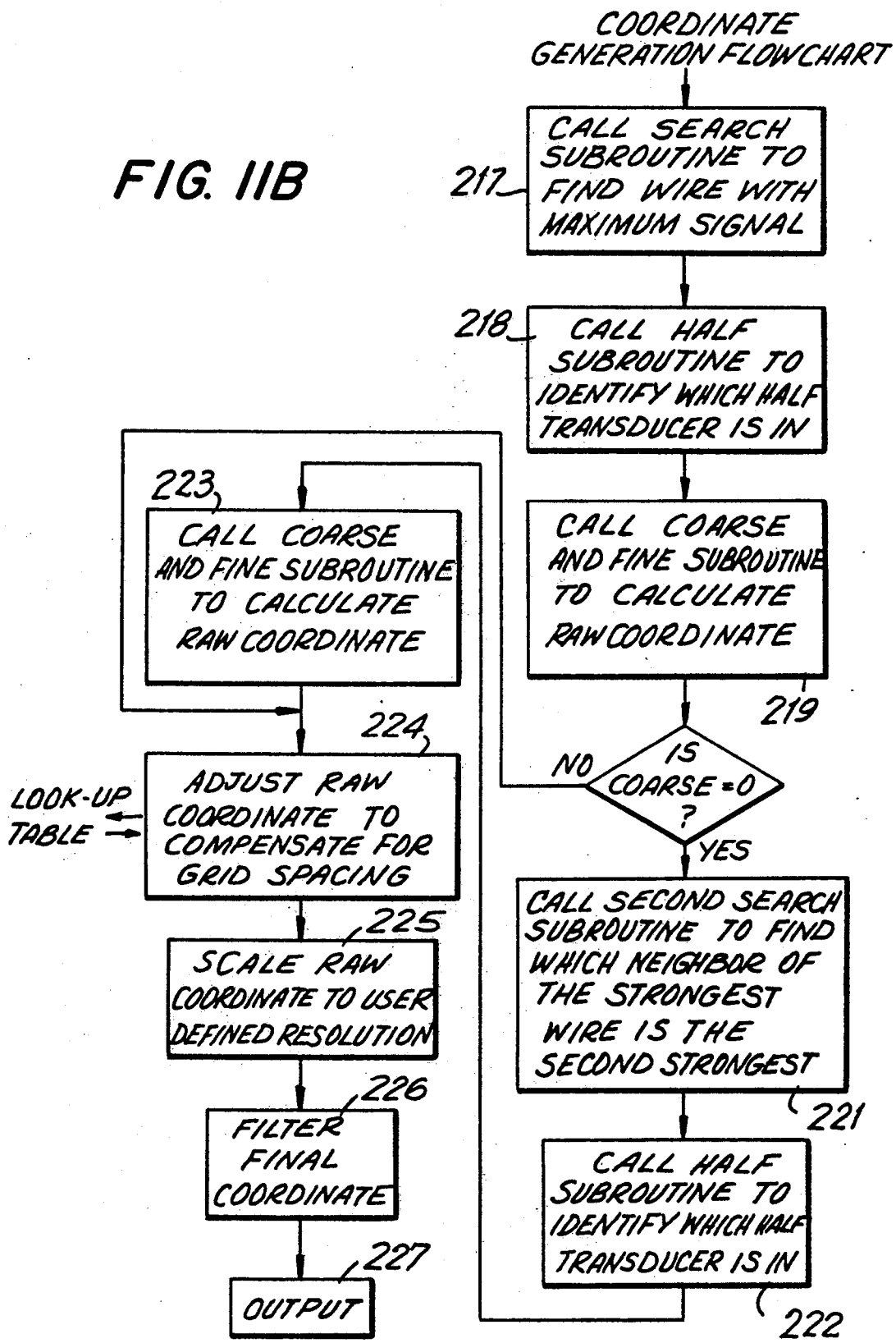

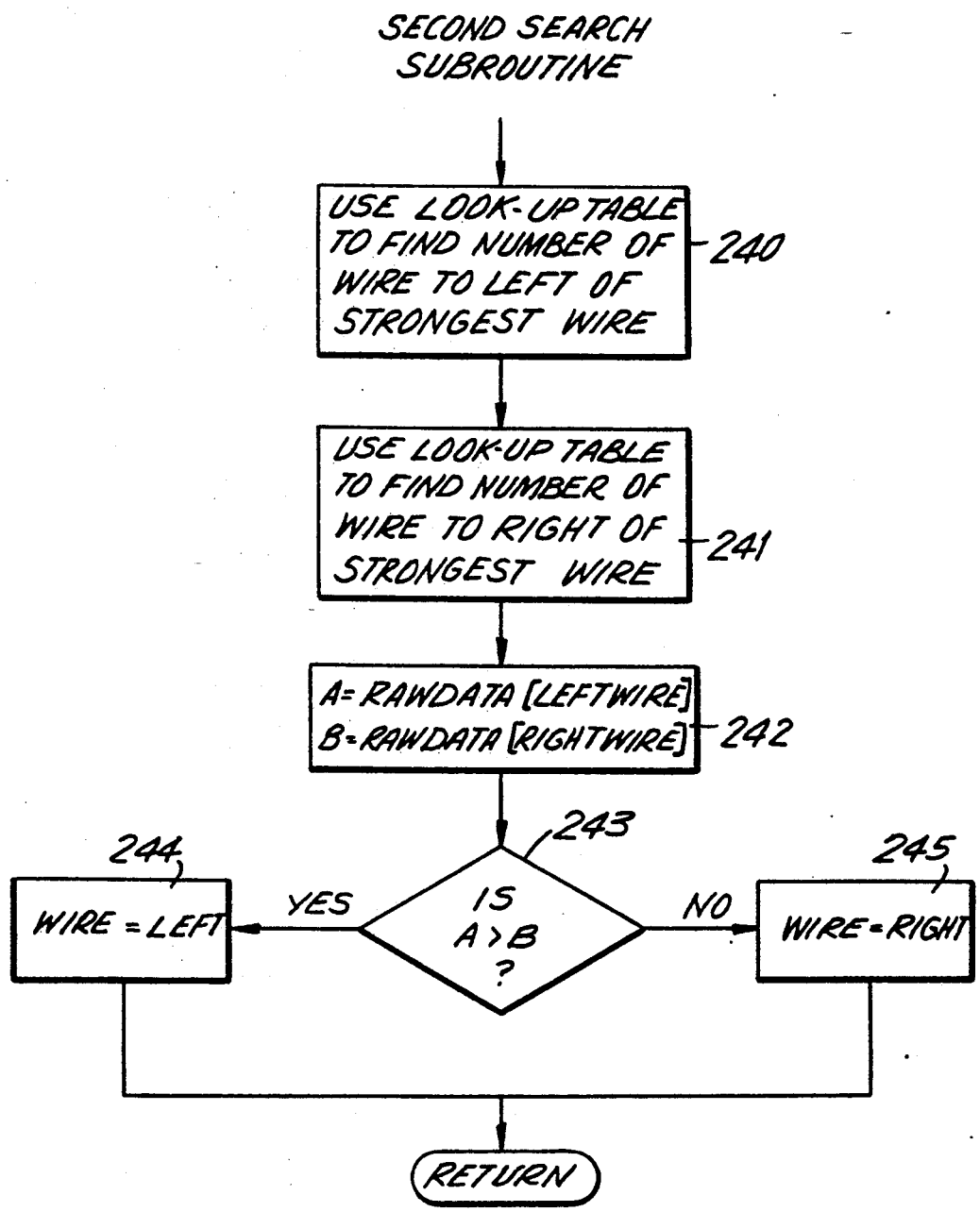

DIGITIZER TABLET WITH FIXED INCREMENTED GRID PORTIONS

RELATED APPLICATIONS

This application is a continuation-in-part of commonly-assigned U.S. patent application, Ser. No. 07/503,537, filed Apr. 3, 1990 U.S. Pat. No. 4,996,393 entitled "Digitizer Tablet With Split-Current Conductor Array", and commonly-assigned U.S. patent application, Ser. No. 07/612,530, filed Nov. 13, 1990, entitled "Low Power Sensing Apparatus For Digitizer Tablets".

BACKGROUND OF INVENTION

This invention relates to digitizer tablets, and in particular to the conductor or grid arrangement of such digitizer tablets.

Copending application, Ser. No. 07/503,537, the disclosure of which is hereby incorporated by reference, discloses a digitizer tablet comprising for each coordinate axis a conductor arrangement of parallel conductors in which each individual conductor comprises a common portion which splits or divides into plural parallel portions, with the common and plural portions of each conductor carrying related currents.

SUMMARY OF INVENTION

The present invention provides a modified version of the conductor array disclosed in said application Ser. No. 07/503,537. In particular, instead of conductor configurations having a common portion which splits into plural parallel portions, the conductors in the array of the present invention which determine coarse positions traverses the active area of the tablet a plurality of times, i.e., are run in serpentine fashion across the tablet, each conductor having two or more spaced, serially connected, serpentine portions, each comprising at least three parallel active conductor portions defining two possible coarse positions. Preferably, the serpentine portions each have a pattern resembling a Greek key ornamentation, referred to herein as a horizontal block-S portion.

Similar to the conductor layout of said application Ser. No 07/503,537, the conductors are laid out in a regular pattern, with overlapping block-S portions, so that the active tablet surface is covered with a substantially uniform layout of active parallel conductors.

In a preferred embodiment, fifteen identical individual conductors are provided, each with two identical spaced block-S portions and therefore with each conductor defining four coarse positions; thus a total of sixty coarse positions is defined over the active tablet surface. Operation is similar to that in the said application Ser. No. 07/503,537. Magnitudes and polarities of induced signals are determined either while pulsing or while scanning each grid conductor, and those values are used to determine two possible coarse positions, one in each of two spaced tablet segments. The final choice of coarse position is made based upon the polarity of the induced signal in or from an auxiliary conductor spanning both tablet segments. Fine position is determined by interpolation using selected signal magnitudes.

This arrangement offers the benefit over the arrangement in said application Ser. No. 07/503,537 that the conductor traces may be shortened considerably since it is unnecessary to provide separate returns for each serpentine portion of each conductor. Moreover, the full current passes through each active portion of each coarse position defining conductor, so induced signals are capable of a higher signal-to-noise ratio (S/N). Because of this capability the invention is particularly suited for use with the low power sensing technology described in said application, Ser. No. 07/612,530, the disclosure of which is incorporated herein by reference. In addition, the conductor array of the present invention is simpler and less expensive to manufacture than the one described in said application Ser. No. 07/503,537. Therefore, the present invention provides not only a simpler and less expensive conductor array, but also a lower power consumption digitizer and thus reduced operating costs.

As a further feature of the invention, a novel algorithm is provided to calculate the position of the pointing device. This novel algorithm is applicable not only to the grid geometry described in this application, but also to the grid geometry described in said application Ser. No. 07/503,537. The algorithm is based upon the recognition that the same fine calculation cannot be used for all of the coarse positions, because the conductor layout does not result in a uniform linear relationship of induced signals in only the nearest wire neighbors.

The algorithm is also based upon the recognition that a certain pattern of uniformity does however exist between m sets of n conductors spaced apart in each set by the total number of coarse positions, $CP_{tot}$ divided by m. Hence, only a small number of distinct algorithms need be implemented in software in order to obtain a tablet capable of a relatively high accuracy considering its low-cost fabrication.

As another feature of the invention, each array conductor comprises at least first and second segments with each segment comprising at least two active parallel conductor portions spaced from one another and the first and second segments extending respectively under first and second spaced regions of the active tablet area. The active parallel conductor portions of each array conductor are connected such that the current flowing in any one of the parallel conductor portions is the same as or an integer multiple of that in any other parallel conductor portion. All of the conductors' first segments form a first group in a regular order and all of the conductors' second segments form a second group in the same regular order and spaced from the first group, whereby the electrical signals generated when the pointing device is over a first segment of each array conductor will be substantially the same as the electrical signals generated when the pointing device is over the second segment of the same array conductor. Means are provided for determining when the pointing device is over the first or over the second segment of each array conductor. The latter means comprises an additional conductor. When as shown in FIG. 1 the segments have a block-S configuration with three active wires per segment, then the same polarity signal is generated when the pointer coil is located over the left half of the left segment or over the right half of the right segment (see arrows designating current flow direction). Similarly, the same polarity signal is generated when the pointer coil is located over the right half of the left segment or over the left half of the right segment.

These and further objects and advantages of the invention will be best understood in connection with the detailed description that follows of several embodiments of the invention, taken in conjunction with the accompanying drawings.

SUMMARY OF DRAWINGS

In the drawings:

FIG. 5 is a block diagram of one form of circuitry for exciting the conductor configuration of FIG. 3.

FIG. 6 is a waveform of the excitation pulses used in the FIG. 5 arrangement;

FIGS. 7, 8 and 9 depicts waveforms at certain nodes of the FIG. 5 schematic;

FIGS. 10A-10E are graphs showing induced voltages from certain conductors to illustrate fine position calculations for different tablet coarse positions;

FIG. 11A-11G are flow charts depicting the algorithms for carrying out the coarse and fine position determinations of the pointing device for a tablet in accordance with the invention.

DETAILED DESCRIPTION OF PREFERRED EMBODIMENTS

Many of the constructional details and circuitry of the present invention are similar to those described in the referenced copending applications. Hence, the description that follows will focus mainly on the differences between the present invention and those described in the copending applications. Further, it will be recognized that the digitizer tablet employs one grid array for the X-coordinate location, and an identical grid array, turned 90°, for the Y coordinate, and a single common exciting and processing circuit for both axes arrays. Typically, the X-coordinate signals are first obtained followed by subsequent processing to obtain the Y-coordinate signals, or vice versa. Hence, the description herein will be given only for the conductor array to generate the X-coordinate of the pointing device, it being understood that a second conductor array, rotated 90°, will be provided and signals generated and processed in the identical manner if it is desired to locate the pointing device position with respect to two coordinate axes, namely, the X and Y axes. Also, when referring to the conductors or conductor array (or the electrodes or electrode array) of the tablet, it will be understood that each conductor is typically an electrically-conductive trace or deposit on a printed circuit will apply to any form of low-ohmic current-carrying medium which is functionally equivalent to a metallic wire or trace. In the description that follows, the terms "conductor" and "wire" are used interchangeably and are not meant to have a limiting sense.

Figure 1:
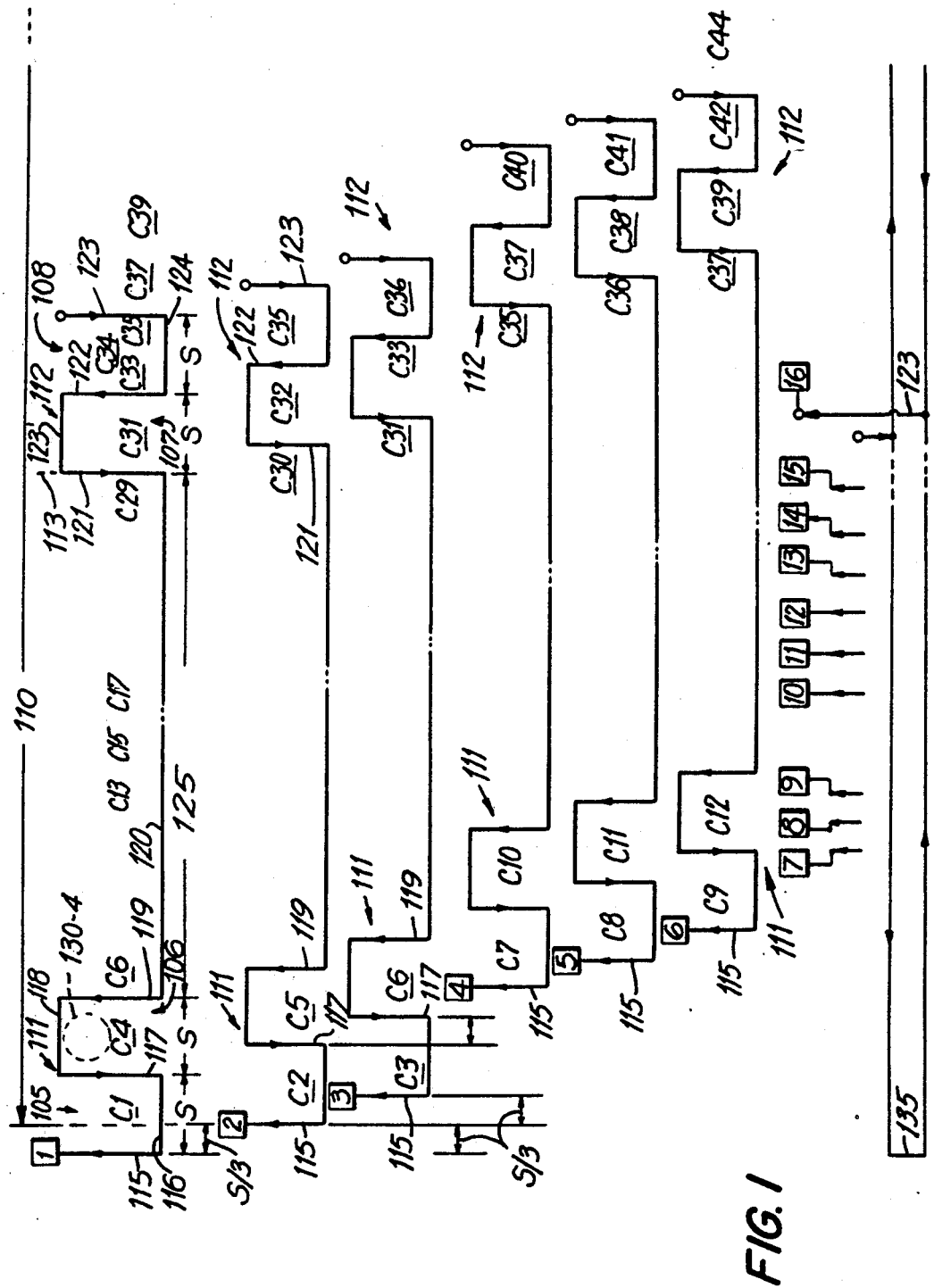
FIG. 1 is a schematic exploded view of part of the electrode pattern for a digitizer tablet in accordance with the invention.

In the preferred embodiment described below, the conductor array for each axis comprises sixteen wires each comprising two sections. With reference to FIG. 1, considering only one coordinate, say, the X coordinate, the tablet has an active area defined by reference numeral 110 in the X-direction. Within that active area are located vertical wire portions made up, for this embodiment, of 16 independent, selectively activatable or scannable wires, numbered #1-#16, which are distributed symmetrically throughout the active area in the following manner. Fifteen of the wires, #1-#15, are identical; the sixteenth, #16, is different. Each of the #1-#15 wires comprises a single conductor (numbered 1-15) forming at opposite ends two block-S portions 111, 112, with the left leg or portion 111 on the left side of the tablet center (indicated schematically by the vertical dashed line 113), called herein the left tablet segment, and the right leg or portion 112 on the right side of the tablet center 113, called herein the right tablet segment.

Each block-S portion comprises three parallel active vertical wire portions. The portion 111 at the left, starting from a first terminal designated by a square labelled 1, has a first active vertical portion 115, a first horizontal connecting piece 116, a second active vertical portion 117, a second horizontal connecting piece 118, and a third active vertical portion 119. The portion 112 on the right is serially connected to the left portion by a third horizontal connecting piece 120, and forms consecutive fourth 121, fifth 122, and sixth 123 active vertical portions, serially connected via fourth 123 and fifth 124 horizontal connecting pieces, finally terminating in a second terminal 125. Each of the vertical wire portions are parallel. The horizontal connecting pieces fall outside of the active tablet area. The three substantially equally spaced vertical portions at each block-S shaped end, which are the active conductors, define, between the middle and the two end wire portions, two regions, designated 105, 106 at the left, and 107, 108 at the right, that correspond to a coarse pointing device position. Thus, each individual conductor, #1-#15, has six active conductors defining four coarse positions.

Figure 2:
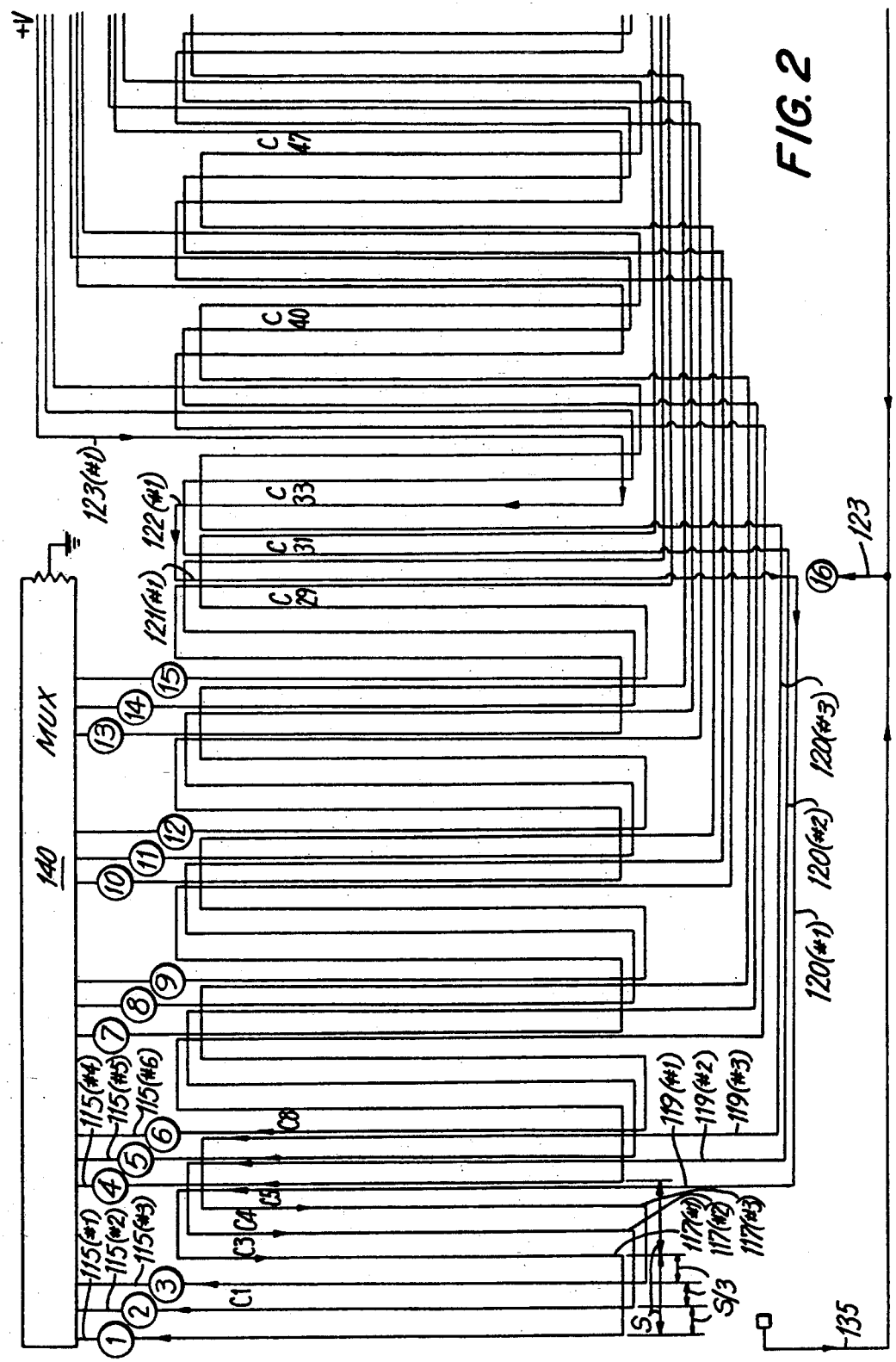
FIG. 2 is a view similar to FIG. 1 but showing some of the grid conductors in their true overlapped positions.

FIG. 1 is an exploded view for clarity. The 16 conductors actually overlap. FIG. 2 shows the overlapped positions in the left segment of conductors #s 1-15. The sixteenth, for clarity, is shown separately below.

As will be observed from FIG. 2, the block-S sections 111, 112 of the second conductor #2 are interleaved and will overlap those of the first conductor #1, spaced one-third of the spacing (designated S) between adjacent vertical portions of the first and the other fourteen conductors. Similarly the block-S portion 111, 112 of the third conductor #3 overlap those of the second, and so forth. While only six conductors #s 1-6 are shown in FIG. 1, the symmetry and layout is continued in the remaining nine conductors #s 7-15 shown schematically at the bottom. The result is that the active tablet area is completely covered by vertical wire portions substantially equally spaced. Thus, in FIGS. 1 and 2, the first 6 adjacent wires spaced S/3 apart are the left conductor 115 of wire #s 1, 2, and 3, followed by the middle conductors 117 of wire #s 1, 2, and 3. The next three are the right conductors 119 of wire #s 1, 2, and 3, but these are superimposed by the left conductor 115 of wire #s 4, 5 and 6. This pattern of 6 consecutive individual spaced conductors at the ends, followed by 6 conductors forming 3 sets of 2 conductors each over 3 positions adjacent three individual spaced conductors repeats across the tablet, and is responsible for the fine calculations used, explained below. This same pattern exists in the grid of Ws in the said application Ser. No. 07/505,537. As each wire defines four possible coarse positions, fifteen wires define 4×15=60 possible coarse positions. The coarse positions are labelled by C followed by a numeral. Thus, C1 is coarse position 1, C2 is coarse position 2, and so forth up until C60, coarse position 60.

As an example, which is not to be considered limiting, for a 12"× 12" tablet, each of the vertical conductor portions would typically be 13" long, to cover the full Y-dimension of the active tablet—extending at top and bottom beyond the active area to reduce edge effects—, each wire conductor would have a width in the X-direction of about 7 ⅜", the spacing S between adjacent vertical portions of a block-S being about ⅜", the length 125 of the horizontal connecting piece 120 about 5 ¼". In the overlapped or interleaved condition, the adjacent conductor spacing is about 0.210".

It will be noted that all conductor terminals fall on the same side of the tablet, the top side as illustrated in FIGS. 1 and 2. This makes it very convenient via a conventional multiplexer to apply a current pulse to each wire in turn in a grid driven embodiment wherein the signals induced in the pointing device are processed for each conductor in turn. For convenience, the conductors are scanned in sequence, but this is not important to the invention. Similarly, in a cursor-driven embodiment, it is relatively simple to scan in sequence each of the wires via their terminals on the same side for deriving the induced signals for processing.

FIGS. 3–9, which are similar to their counterparts in said application Ser. No. 07/503,537, show the operation, which is identical to that described said Ser. No. 07/503,537.

Figure 3:
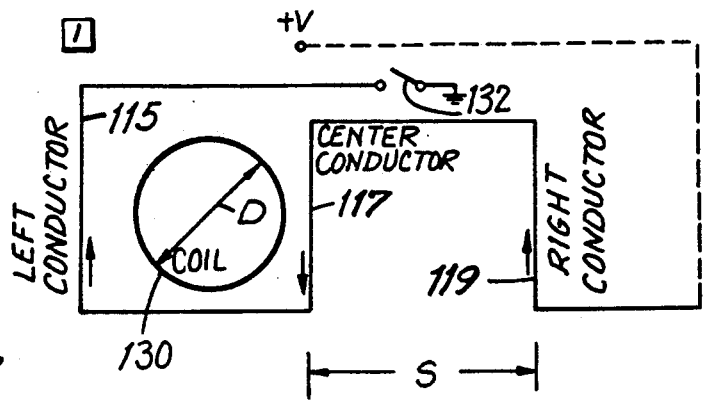
FIG. 3 is a schematic view of one conductor to illustrate operation of the, invention.
Figure 4:
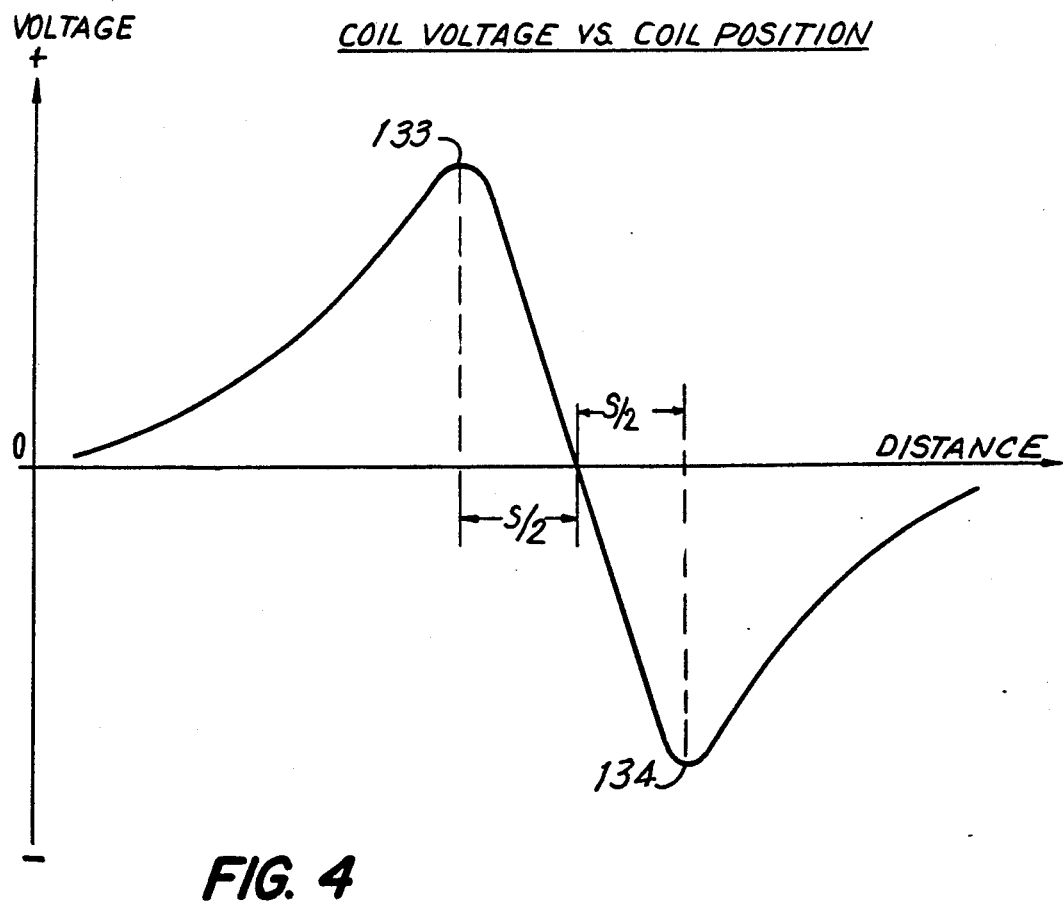
FIG. 4 shows the signal induced in a coil as a function of its relation to the conductor configuration of FIG. 3.

FIG. 3 illustrates a single block-S wire configuration, with a middle wire 117, a right wire 119 and a left wire 115. The left and right wires 115, 119 are spaced the same distance S from the common middle wire 117. A voltage source V is connected to the opposite end of the conductor (the terminal to conductor 123), and the left end (marked 1)) is connected to ground as a sink via a switch 132. Suppose now that switch 132 is closed for successive short periods of time, and during each interval, a coil 130 is moved horizontally across the block-S wire. FIG. 4 shows a plot of the voltage induced in the coil 130 as a function of its horizontal position relative to the block-S. It will be observed that a positive peak voltage or MAX(+) 133 is obtained when the center of coil 130 is located midway between the left 115 and middle 117 conductors, that is, the distance S/2 from the center conductor. Similarly, due to the reversed field direction, a negative peak voltage or MAX(−) 134 is obtained when the center of coil 130 is located midway between the middle 117 and right 119 conductors, again spaced the same distance S/2 from the center conductor. We can thus define two MAXs or two coarse positions associated with each U of the block-S configuration of a wire. In FIG. 1, these have been designated as coarse positions C1 and C4.

The explanation given above to demonstrate how positive and negative voltages are generated depending upon whether the coil is located respectively over the left and right half of the block-S configuration in, say, the left segment, will apply equally to the block-S configuration 112 of the same numbered wire in the right segment except that the polarities are reversed. In other words, looking at wire #1 in FIG. 1, when the coil is midway between conductors 115 and 117 in the left segment a positive polarity peak voltage is then generated; when the coil is midway between conductors 121 and 122 in the right segment, due to the opposite current directions, a negative polarity peak voltage will be generated. Hence, in the left segment, for each numbered wire, an induced positive peak indicates a coarse location to the left of the middle conductor of the block-S, and in the right segment, an induced negative peak indicates a location to the left of the middle conductor of the block-S. Since each numbered wire provides a block-S portion in the left segment and a block-S portion in the right segment, four coarse positions are associated with each of #s 1–15 wires, which is how one arrives at sixty coarse positions. Note also from FIG. 4 that a zero voltage is induced in the coil 130 when it is centered exactly over the middle conductor. The various course positions are shown in FIG. 1, each of which covers a tablet region equal to S/3 units wide. Returning now to FIG. 2, it will be observed that there are two additional numbered wires #2 and #3 whose middle conductors are located between the middle conductor 117(#1) of the #1 wire and its right conductor 119(#1).

Summarizing, the pointing device is an inductive coil with a diameter D roughly equal to, preferably slightly smaller than, the spacing S between adjacent active wire portions of each numbered wire. See the circle designated 130 in FIG. 3. Each numbered wire is separately activated in turn. In the position of coil 130 shown in FIG. 3, a maximum signal voltage of one polarity will be induced in the coil when a signal is applied to the selected activated wire, because the current in wire portion 117(#1) will flow in opposition to that flowing in 115(#1). When coil 130 is moved to the right, midway between wire portions 119(#1) and 117(#1), a maximum signal of the opposite polarity is induced in coil 130, again because of opposite current flows in the wire portions adjacent opposite coil sides. Arrows have been provided for the #1 wire to show the opposite current flows. When the coil is positioned with its center exactly over the middle wire 117(#1), a minimum (ideally zero) voltage will be induced in the coil 30. Thus, as the device coil 30 moves between the three positions described, when wire #1 is activated, the induced signal voltage varies from a maximum at one polarity to a minimum (zero) and then to a maximum of the opposite polarity, as indicated in FIG. 4. It is possible within the scope of this invention to detect and distinguish the positive and negative MAXs, thereby enabling two coarse positions per wire to be determined in the left segment. By similar reasoning, it will be apparent that when the device coil is located in the right segment, over the space between 122(#1) and 123(#1), or moved to the left between 121(#1) and 122(#1), again positive and negative polarity MAX signals will respectively be generated when wire #1 is activated. Hence, assuming one can determine whether the device coil 130 is over the left or the right tablet segment, a total of four coarse positions would be defined by wire #1. With fifteen wires similar to #1 present, a total of 60 coarse positions would be defined, provided that polarity as well as MAX were employed as the identifying key.

The last independent wire #16, as will be noted from FIG. 1, comprises a single large W similar to that in the related application, with a middle wire conductor 123 extending vertically, which splits into a left vertical conductor 135 and a right vertical conductor 136 (off the drawing to the right), which return to a common terminal of a current source. The middle wire 123(#16) is located at the exact center 113 of the tablet within the active area (shown below in FIG. 1 for simplicity). The left vertical portion 135 (#16) lies adjacent the vertical portion 115(#1) at the left edge of the active area. The right vertical portion 136(#16) lies adjacent the vertical wire portion at the right edge of the active area, which in this instance would be 123(#15) (not shown). FIG. 2, incidentally, is not to scale.

In operation of the system, +5 volts is applied to the unlabeled terminals at the right end of FIG. 1. Then, a multiplexer 140 (FIG. 2) connects each numbered wire terminal in sequence to a reference potential, such as ground, for a short time interval. Detecting circuits are connected to the pointing device coil 130. A signal waveform is induced in the cursor coil during the resultant wire grid pulsing. The magnitude and polarity of the largest value of signal voltage is determined for each numbered wire in turn and stored.

FIG. 5 shows the basic circuit, simplified for a single block-S wire. A microcontroller 150 controls the scanning of the wires and voltage measurements. An enable pulse corresponding to the action of multiplexer switch 132 activates the wire. A typical pulse is shown in FIG. 6. The wire to wire scanning or sampling time is, for example, 100 microseconds, equivalent to a scan frequency of 10 kHz. These values are not critical. A sine wave voltage signal is induced in the coil 130. The frequency will depend upon the coil inductance and other circuit parameters, typically a resonating capacitor. As an example, which is not limiting, for a 12 inch tablet, with a wire spacing S equal to about 0.630 inches, and a coil diameter D equal to about 0.6 inches, and with 30 turns, the circuit will resonate in the vicinity of about 200 kHz. FIG. 7 shows the induced signal voltage in the coil 130 after it has been amplified and passed through a band-pass filter 151, at the node A. The coil signal is a damped oscillation, having positive and negative peaks. A dual sample and hold (S/H) circuit 152 is provided, activated by the microcontroller as shown. The result is that the S/H circuit 152 samples and holds the first positive peak, as shown in FIG. 8, and next samples and holds the second negative peak indicated at FIG. 9. The results are processed in the microcontroller 150 through a conventional A/D converter (not shown), and the digital values stored in memory 153. Each of the numbered wires are similarly scanned in succession and the coil voltages processed in a similar manner. The circuitry of the amplifier and bandpass filter block 151 and the dual S/H block 152 is straightforward and conventional and requires no further elaboration for those skilled in this art. The filter characteristics are chosen to pass the desired oscillatory signal and reject other frequencies to improve the signal to noise ratio. Similarly, programming of the microcontroller 150 to perform the functions described above will be obvious to those skilled in this art.

The cursor coil diameter, D, should be no greater than the spacing S between adjacent active wire portions of each numbered wire, and preferably slightly smaller. The purpose is to maximize the induced voltage when the coil is located exactly midway over the space between adjacent wire portions of the same numbered wire.

When wire #16 is scanned, it too will induce a signal voltage in the coil 130. Similarly to the description given above for wire #1, when the coil is over the left tablet segment, due to the direction of the arrowed current flow in active wire portions 123 and 135, a voltage of one polarity is induced in coil 130. When the coil is over the right segment, a signal voltage of the opposite polarity is induced in the coil. It will be further understood that if by chance the coil center is precisely voltage is induced in the coil. However, due to practical constraints in constructing a perfect wire #16, the latter situation will hardly ever occur. Hence, signal polarity of the voltage associated with wire #16 is used as the key to unambiguously determine whether the MAX (magnitude) signal associated with any of wire #s 1-15 is from its left segment or right segment portion.

The determination of coarse position therefore requires a determination of which of #s 1-15 wires, when activated, induced a MAX signal in the device coil, the polarity of the MAX signal, and a determination of the polarity of the signal induced in the #16 wire. These three items of information enable a determination of 1 of 60 possible coarse positions. While, in principle, a single scan of the #1-16 wires, and collection and storage of the induced signals (magnitude and polarity for #s 1-15; polarity for #16) from the coil is all the information needed to make a coarse position determination, in actual practice, since the scanning rate is typically thousands of times per second, e.g., 10 kHz, it is readily possible to carry out multiple scans of the same device position before the user will be able to move the device. This would allow a number of determinations to be made, and for averaging to be used, typically done in software, to improve the accuracy. This averaging process is common in commercial tablets.

Determination of the coarse position can then be made in a number of different ways. One simple way is, using known software or hardware, by converting each analog signal into its digital equivalent, and then processing the digital signals through a known MAX detector circuit, or, by software, determining the positive and negative MAXs, and storing these in arrays indexed by wire number. Now, means are provided to map the wire number to the coarse position. Again, there are many ways to do this. A preferred way to do this will be described below in connection with FIGS. 11A-11G. The following definitions apply to the terms used in the coarse and fine position flowcharts of FIGS. 11A-11G:

| | |
|---|---|
| WIRE NUMBER = | This is the number [1 . . . 16] of the physical grid circuit being energized. |
| COARSE POSITION = | This is a synthetic number [1 . . . 60] that represents coarse position. It is only indirectly related to the physical wires. (1=Left or bottom, 60= right or top) |
| FINE POSITION = | Represents the interpolated location within a coarse position. |
| WIRE = | Number [1 . . . 15] of the physical wire with the strongest signal. |
| WIRE ADDRESS = | Raw data array address of wire with strongest signal. |

During each scan, which includes all sixteen wires, the magnitude and polarity of the induced (and processed) signal derived from each wire is stored in an array having 16 locations indexed by wire number. From the values stored in that array, it is relatively simple to determine the MAX signal and thus the wire number with the strongest signal using a straightforward MAX routine. Next, the segment half is determined, and finally the coarse and fine determinations are made. This processing basically is identical to that disclosed in said application Ser. No. 07/503,537. However, certain additional determinations should be made for reasons discussed below.

When the identified MAX wire is #1, then the signal from wire #16 tends to be weak, making occasionally ambiguous the determination as to which segment half is involved. Thus, an additional calculation is carried out by comparing the values of both wires #1 and #15, and that comparison determines whether it is the left or right segment.

One of the features of the invention are the calculations for determining the fine position. It will be noted that, due to the wire layout, a certain pattern is present that repeats globally every six wires, with three positive followed by three negative values associated with each of the patterns. This 6-conductor and polarity repeat pattern is the same for both the left and right tablet segments, and is characteristic of the preferred layout illustrated where the pitch between adjacent parallel conductors portions is S/3, and S is the pitch between active conductor portions of each block-S pattern (see FIG. 2). That is, the pattern repeats two times the minimum count of conductors between active portions of the same numbered conductor. I have found that there exists m sets each of n coarse positions defined by N conductors wherein the separation between coarse positions is equal to $CP_{tot}/n$, where $CP_{tot}$ is the total number of coarse positions. For the illustrative example given above where $CP_{tot}=60$, obtained with 4 times N=15 conductors, there exists six sets of ten coarse positions each, each of the ten in each set separated by a difference $CP_{tot}/n$, where the difference in this instance =60/10=6 or a multiple of 6.

As previously mentioned, a pattern of six coarse positions repeats across the tablet in the strictest sense, and each coarse position within this pattern requires its own unique fine position formula. For two positions out of the six, the formulas were similar enough to allow them to be merged into a single formula. As a result, only five fine position calculations or algorithms are needed to determine fine position. This means that the amount of code required to implement these algorithms can be kept to a reasonably low value easily within the capacity of the PROM used to store the tablet operating system. Moreover, it turns out that the accuracy is remarkably high considering the relatively simple and inexpensive construction. In tests that have been conducted with a prototype tablet using a cursor or puck as the pointing device, it has been found that a tablet constructed according to the invention, with reasonable tolerances used in the grid manufacture, had an accuracy for a 12" × 12" tablet of better than +/−0.010 inches.

The above-mentioned calculations are implemented as five distinct algorithms, named FORMULA SET #1-FORMULA SET #5, and are listed below in pseudocode:

---

FORMULA SET #1
USED FOR COARSE POSITIONS: 1, 7, 13, 19, 25, 31, 37, 43, 49, 55, and 6, 12, 18, 24, 30, 36, 42, 48, 54, 60

```
SUM1 = VIRTUAL[WIRE+1] + VIRTUAL[WIRE−2]
SUM2 = VIRTUAL[WIRE−1] + VIRTUAL[WIRE+2]
IF (SUM1 < 0) AND (SUM2 >= 0) THEN
  1) COARSE=WIRE−(WIRE MOD 3) (VIA
     LOOK-UP TABLE)
  IF COARSE >1 AND COARSE < 60 THEN
     N = VIRTUAL[WIRE+1] + VIRTUAL[WIRE−1]
     IF N < 0 THEN
       D = VIRTUAL[WIRE+2] − VIRTUAL[WIRE+1]
       FINE = CNTS + (N/2D)
     ELSE
       D = VIRTUAL[WIRE−1] − VIRTUAL[WIRE−2]
       FINE=CNTS − (N/2D)
```

FORMULA SET #2
USED FOR COARSE POSITIONS: 3, 9, 15, 21, 27, 33, 39, 45, 51, 57

```
IF (VIRTUAL[WIRE−2] >= 0) AND
   (VIRTUAL[WIRE−1] < 0)
  THEN
  1) COARSE=WIRE−(WIRE MOD 3)
     VIA LOOK-UP TABLE)
  2) COARSE = COARSE − 3
  3) N = VIRTUAL[WIRE−2]
  4) D = VIRTUAL[WIRE−2] − VIRTUAL[WIRE−1]
  5) FINE = N/D
```

FORMULA SET #3
USED FOR COARSE POSITIONS: 2, 8, 14, 20, 26, 32, 38, 44, 50, 56

```
SUM = VIRTUAL[WIRE+1] + VIRTUAL[WIRE−2]
IF (SUM < 0) AND VIRTUAL[WIRE−1] < 0 THEN
  1) COARSE=WIRE−(WIRE MOD 3) (VIA LOOK-UP TABLE)
  2) IF COARSE=2 THEN
     D = VIRTUAL[WIRE]
  ELSE
     D = VIRTUAL[WIRE−1] + VIRTUAL[WIRE−2]
     D = D + VIRTUAL[WIRE+1]
  3) N = VIRTUAL[WIRE−1]
  4) FINE = 1 − N/D
```

FORMULA SET #4
USED FOR COARSE POSITIONS: 4, 10, 16, 22, 28, 34, 40, 46, 52, 58

```
IF (VIRTUAL[WIRE+2] < 0) AND
   (VIRTUAL[WIRE+1] >=0) THEN
  1) COARSE=WIRE−(WIRE MOD 3)
     VIA LOOK-UP TABLE)
  2) COARSE = COARSE + 3
  3) N = VIRTUAL[WIRE+1]
  4) D = VIRTUAL[WIRE+1]−VIRTUAL[WIRE+2]
  5) FINE = N/D
```

FORMULA SET #5
USED FOR COARSE POSITIONS: 5, 11, 17, 23, 29, 35, 41, 47, 53, 59

```
SUM = VIRTUAL[WIRE+2] + VIRTUAL[WIRE−1]
IF (SUM >= 0) AND (VIRTUAL[WIRE+1] >= 0) THEN
  1) COARSE=WIRE−(WIRE MOD 3)(VIA LOOK-UP TABLE)
  2) COARSE = COARSE + 3
  3) N = VIRTUAL[WIRE+1]
  4) IF COARSE=59 THEN
     D=VIRTUAL[WIRE]
  ELSE
     D = VIRTUAL[WIRE−1] + VIRTUAL[WIRE+2]
     D = D + D + VIRTUAL[WIRE+1]
  5) FINE = N/D.
```

CNTS in FORMULA SET #1 is a constant value representative of each coarse position (actually equal to the number of counts per wire spacing). Thus, if one assumes a total count of, say, 6000 for the furthest most pointing device position, each of the 60 coarse positions is represented by an increment of 100. Thus, for this assumed example, CNTS=100. COARSE is the coarse position determined, and FINE is the fine position determined.

The terms "VIRTUAL" and "WIRE" are, respectively, an array name and a variable name, which can be explained as follows.

Because of the symmetry involved, each signal look-up table which maps the wire number with the MAX signal and its polarity requires only 15 entries, for N conductors=15, which will give 1 of 30 coarse positions for each tablet segment. What is then required is to know, from wire #16, whether the pointing device is over the left or right segment. Hence, it is convenient to save memory to create a conceptual (not real) virtual data array (called VIRTUAL), which is an image of the real array for the 15 signal magnitudes but mapped twice over 30 locations. In other words, each signal value for a wire number N is mapped to two virtual data locations N and N + 15. The subroutine which converts the raw data to its virtual data counterpart appears in FIG. 11G. Now, the value of the variable WIRE representing the array index holding the signal magnitudes can be extended from 1..15 to 1..30, with the evaluated virtual positions 1..15 now representing cursor position over the tablet left half and the virtual positions 16..30 representing cursor position over the right tablet half. This simplifies the calculations of the FINE position.

Absolute position is then determined by the sum of (COARSE X CNTS) plus FINE, giving an integer value of counts. For, again, an assumed 12" tablet span covering the range of 6000 counts, each count corresponds to 12 inches/6000 and each count=0.002 inches or 2 mils. Thus, if the counts value obtained is, say, 1326 counts, the center of the pointing device coil is located 1326 × 0.002 or 2.652 inches from the origin of the coordinate axis. This gives what is known as a raw coordinate. Adjustments are usually necessary to take into account non-linearities, especially at the edges, and variations in grid spacings, due to some conductors being alone, whereas others are crowded together, and manufacturing tolerances. This is typically handled with a look-up table which maps the raw coordinate to an adjusted raw coordinate to compensate for these minor deviations. The look-up table can be the same for all the same-sized tablets, thus, say, for all 12 inch tablets. A different look-up table, determined empirically, would exist for other sized tablets.

The thus-adjusted raw coordinate is then scaled in accordance with the user defined resolution, an option available to the user during start-up. This is similar to techniques commonly used, the purpose of which is to match the screen size of the monitor to the significant area being drawn. As one example, the desired user resolution is equal to the raw resolution times a constant, where the constant equals the user lines per inch divided by the raw lines per inch. The thus-scaled raw coordinate is finally filtered before being outputted to the host. The filtering, typically digital low pass filtering, is well known in the art and typically involves an averaging process of the multiple scans that are made with avoid erratic and inconsistent data due to user movement or pointing device position.

The calculations based on the above-described algorithms can be used not only for the grid geometry employing block-S ends described in this application, but also with the grid geometry employing Ws described in the parent application, Ser. No. 503,537.

A feature of this invention, also present in said parent application, is that each of the fifteen position conductors have a substantially identical symmetry. That is, each of the fifteen wires #1...#15 are the same, only displaced by a distance equal to S/3, where S is the width of a loop. This generally symmetrical arrangement will provide coarse positions defined by each loop substantially uniformly across the full length of one tablet coordinate. Thus, the staggering pattern of loops over the left tablet segment is identical to that over the right tablet segment, and each wire of the fifteen has its loops in corresponding parts of each segment. Moreover the numbering sequence is regular, with the #1 wire having its loops at the far left end of each of the tablet segments, and with the #15 wire having its loops at the far right end tablet segment. Still further, the conductors can be scanned in exactly the same order during each scanning cycle. Typically, this would be in numerical sequence; thus #1, #2, #3, . . . #15. The invention is not limited to this numerical sequence, but it is the simplest to implement. Moreover, the scanning current values and directions are the same for all fifteen conductors. Thus, there is no scrambling of conductors, or of conductor scanning, or of conductor currents. A major advantage of this feature is the resultant substantially regular layout, with all of the fifteen conductors having their terminals at the same one edge of the tablet. This greatly simplifies the conductor layout, and offers the further advantage of allowing the energizing and processing circuitry to be located along or adjacent that same tablet edge, which reduces the length of the interconnections and thus tends to reduce undesirable interference from stray magnetic fields.

As a result of this substantially regular, uniform pattern of position conductors, it is necessary to add the sixteenth wire to resolve the inherent ambiguity that the pointing device can be over either of the block-S or W sections of the conductor producing the MAX signal during each scan.

Moreover, some irregularities are present. This is due to several factors. First, the conductors are deposited traces on a PCB, and thus have a certain width. Moreover, it is desirable to minimize the resistance of each wire to maximize the scanning current for maximum S/N ratio, for a given size of current driver. This tends to increase the trace width. A further factor is a preference for using a silver-based conductive ink for the traces, which offers certain deposition advantages. But, a silver-based ink has a higher resistivity than copper. Hence, it may be found desirable to widen the trace at the center of adjacent loops at each block end.

Finally, it will be appreciated that many of the traces, ideally, should be at the exact same position. To achieve this would require a more expensive construction of conductor-insulator-conductor involving several deposition steps. It is preferred, however, that the entire grid pattern be laid down during the same deposition step.

These factors contribute to an actual layout of the conductors that deviates from the ideal. Hence, for optimum accuracy, a look-up tablet of corrections is provided for those calculated positions that deviate too much from the correct value. This type of correction is common in many commercial tablets.

In the five calculations, the pattern of voltages active over each coarse position region repeats every six conductors. But, different combinations of the active voltages are needed to obtain a substantially linear relationship to allow for a reasonably accurate fine calculation using simple voltage differences and ratios. This will be evident from FIGS. 10A–10E, which are graphs showing the signal voltage (ordinate) induced when the wire numbers indicated are scanned as a function of pointing device position along the abscissa for the tablet region indicated by coarse positions C3–C10. The middle horizontal axis is the 0 voltage line. Voltages in the upper half are positive and voltages in the lower half are negative. Also shown on each graph for different coarse positions are one or more straight lines each labelled with two wire numbers. These are approximate linear relationships, which when used as indicated in the relevant FORMULA SET noted on each of the figures will produce a composite relationship that has a high degree of linearity.

Thus, FORMULA SET #1 uses the voltage difference between adjacent wire numbers 2 and 1, and 5 and 4, and the sum of the voltages at wires 2 and 4, for the fine calculation for the set of wire numbers and coarse positions indicated above for FORMULA SET #1, which includes coarse positions C6 and C7. The straight lines representing those differences and sum voltages are shown for coarse position C6. Similar lines can be drawn for position C7.

FIG. 10B, for FORMULA SET #2, shows that for coarse position C9, only the voltage difference between adjacent wires 4 and 5 is used. Thus, for coarse position C9, two of the significant voltages occurring at C9 are used in the fine calculation. For coarse positions C6 and C7, as noted above, four of the six significant coarse positions in this set. In FIG. 10C, the voltage sum of three of the four significant induced voltages in adjacent wires #s 4, 3 and 6 are used--see the straight line for coarse position C8—and, again, this applies to all coarse positions in this set, FORMULA SET #3.

For FORMULA SET #4 (FIG. 10D), the sum of voltages induced in adjacent wires #s 2 and 3 is used, and for FORMULA SET #5 (FIG. 10E) the sum of voltages induced in adjacent wires #s 1, 3 and 4 is used.

This is one of the more remarkable and unexpected aspects of this invention; that there exist for a small number of sets of coarse positions a combination of sum or difference induced voltages in neighboring wires of the MAX wire from which a reasonably accurate fine position calculation can be carried out using simple ratios in the computation of linear formulas. In every instance, however, at least two voltage values, derived from two separate conductors, must be used, so that the interpolation involves a ratio of sums or difference or both in a linear calculation. If, instead, the voltage value of a single conductor were used, that happened to appear to vary linearly over the range of a coarse position, it would still be unreliable because the values measured would not be independent of the orientation or height of the pointing device and therefore could not reliably determine a fine position to close tolerances within that coarse position. The use of voltage magnitudes of several conductors in the calculation avoids the dependence on pointing device position and increases reliability.

In general, the following relations hold for the block S and W conductor grids. With N conductors distributed over a tablet active area divided up into R segments, with each conductor having an active portion located in each segment, a total, $CP_{tot}$, of 2RN coarse positions are defined. This will require m sets of fine calculations for n coarse positions in each set separated by $CP_{tot}/n$ coarse positions. For the preferred embodiment, N=15, R=2, $CP_{tot}$=2RN=60, m=6 and n=10. The same calculation can be used for two of the coarse position sets.

FIGS. 11A-11G are flow charts illustrating a preferred software implementation of the system which applies to wires with active W portions, wires with active block-S portions, and equivalent configurations. Thus, raw data is searched for the strongest signal which identifies the closest wire, and as a result of that search a return to the wire number and its address, shown in block 210. Next the polarity of the voltage obtained from wire #16 is used to identify which segment half of the tablet the pointing device is over, shown at block 211. That information is then used to determined the coarse and fine positions as shown in block 212. If the indication is that the coarse position is equal to 0, sometimes due to edge effects, it is necessary to run a second search routine to look for the wire number and address of the second strongest signal, indicated at block 213, after which the coarse and fine positions are redetermined. The result of the previous steps is to produce the raw coordinate of the pointing device position and it then becomes necessary to compensate for any grid network deviations from the ideal, which may be implemented conventionally as shown at 214, and finally the adjusted coordinates are outputted at 215.

Figure 11A:
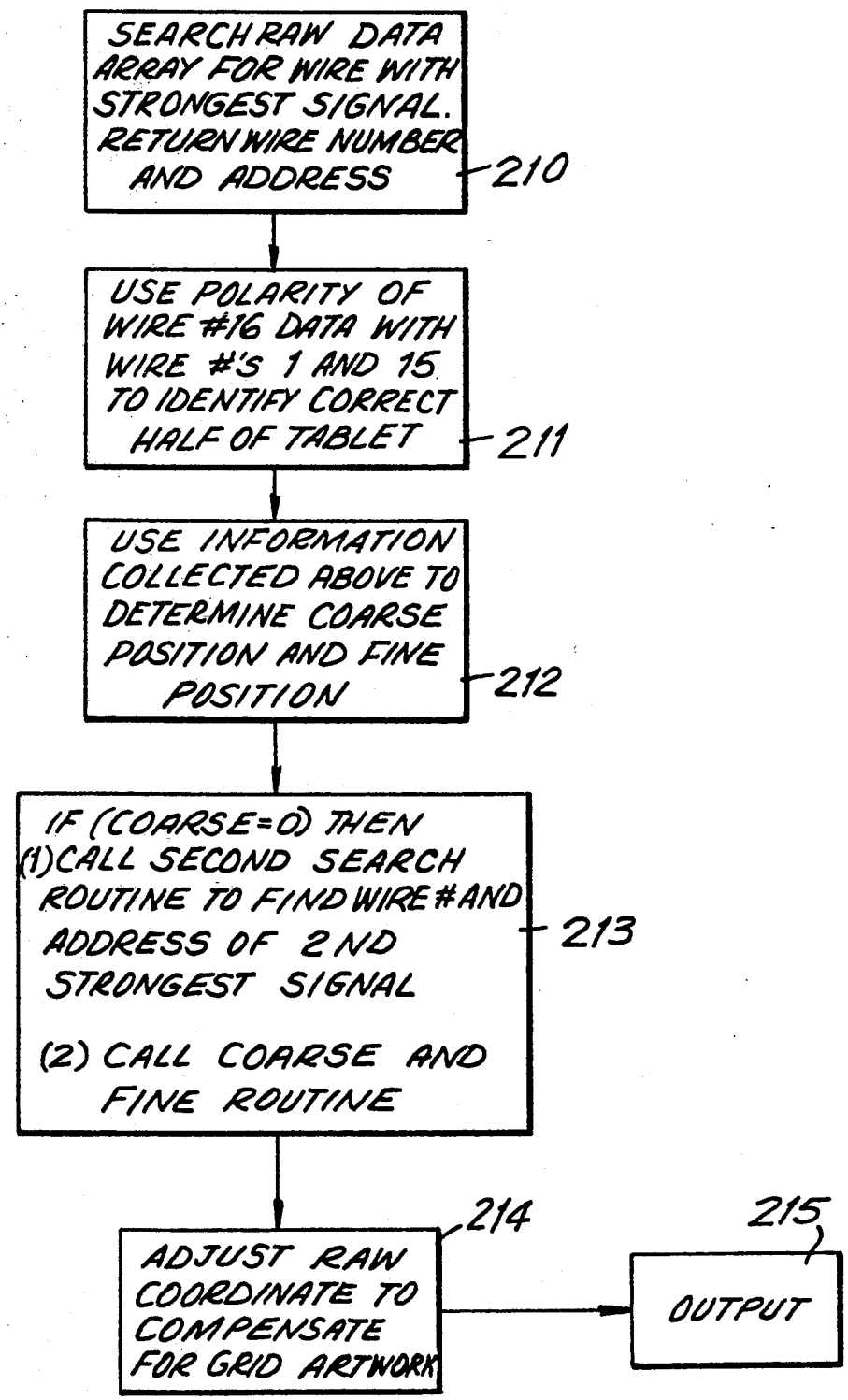

FIG. 11B shows a somewhat more detailed flow chart than FIG. 11A, where blocks 217, 218 and 219 of FIG. 11B correspond to blocks 210, 211, and 212 of FIG. 11A, respectively, and block 220 indicates the test for whether the coarse position is equal to 0. If the answer is "YES", then the second search subroutine is called at 221 which corresponds together with blocks 222 and 223 to block 213 in FIG. 11A. Block 224 corresponds to block 214, with the adjustments being derived as indicated from a separate look-up table. Block 225 shows a technique to provide the proper scale of the raw coordinates to fill the display on the host computer, and block 226 indicates some additional filtering, both of which may be implemented conventionally. Finally, block 227 shows the output of the adjusted coordinates to the host computer.

Figure 11C:
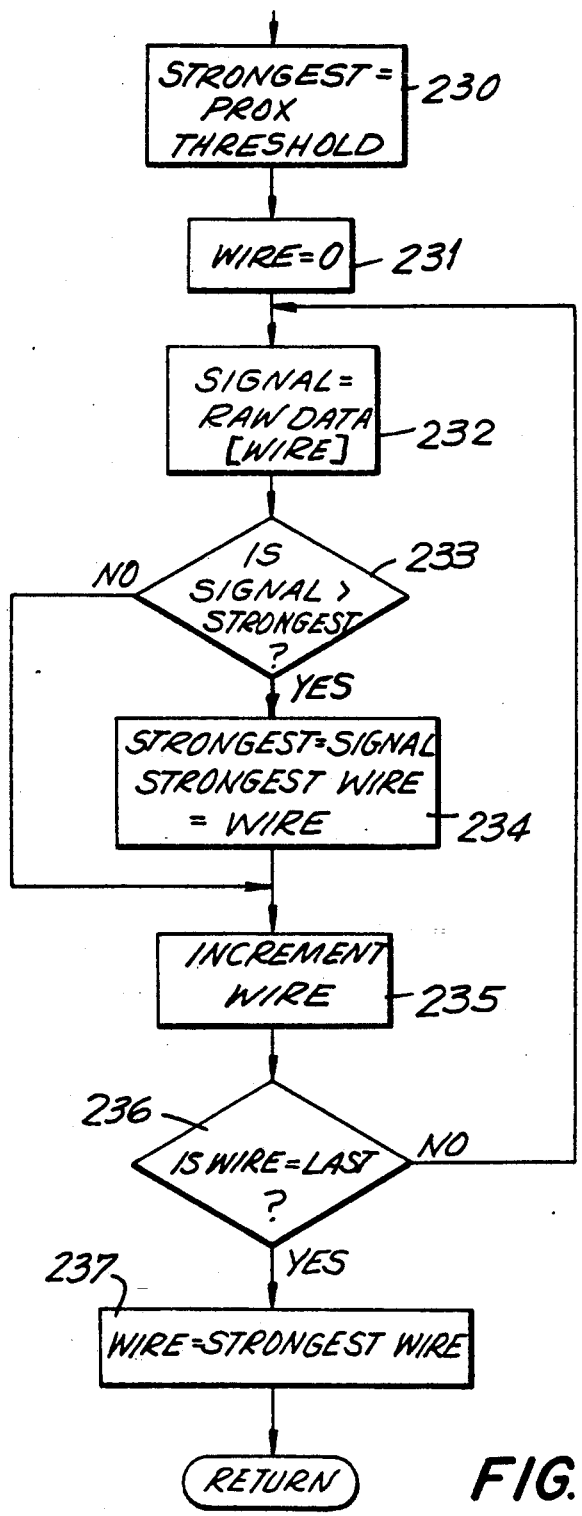

FIG. 11C shows in blocks 230-236 more details of the search subroutine which is in pseudocode form, and may correspond to a conventional MAX computer search routine. The block 237 assigns for later processing the number of the MAX wire also to the variable WIRE.

FIG. 11D shows the second search subroutine when the wire number in the previous processing is determined to be 0. In this routine, which is designed to account for end effects which distorts the voltage peaks obtained from each of the wires, the look-up table is scanned in blocks 240 and 241 to find the number of the wire to the left and to the right of the strongest wire. The values associated with each of those wires is then assigned to the temporary variables A and B, at block 242. A test is then made whether A is greater than B at block 243, and if the answer is "YES" then the variable WIRE gets assigned the number of the wire to the left of the strongest Wire, and if the answer is "NO" then the variable WIRE gets assigned the number of the wire to the right of the strongest wire.

Figure 11E:
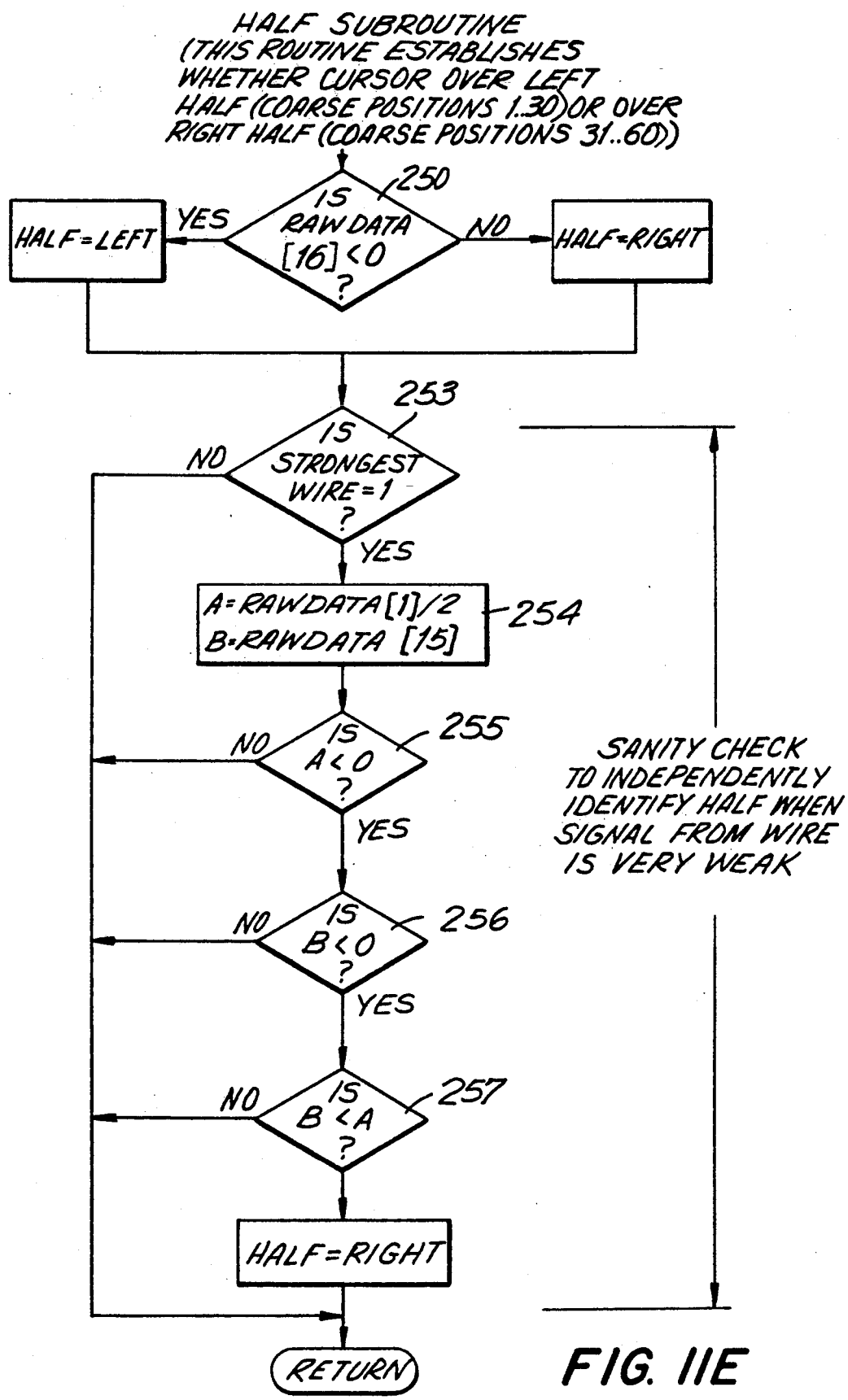

FIG. 11E illustrates a routine for establishing whether the cursor of the pointing device is over the left half of the tablet or over the right half of the tablet, using the polarity of the signal induced in wire #16. However, it may turn out that the signal from wire #16 is very weak, which may not be producing an unambiguous indication as to which segment of the tablet is involved. Accordingly, a so-called "Sanity Check" is carried out as indicated in this figure at blocks 253-258, to independently verify over which segment of the tablet the pointing device is located over.

Figure 11F:
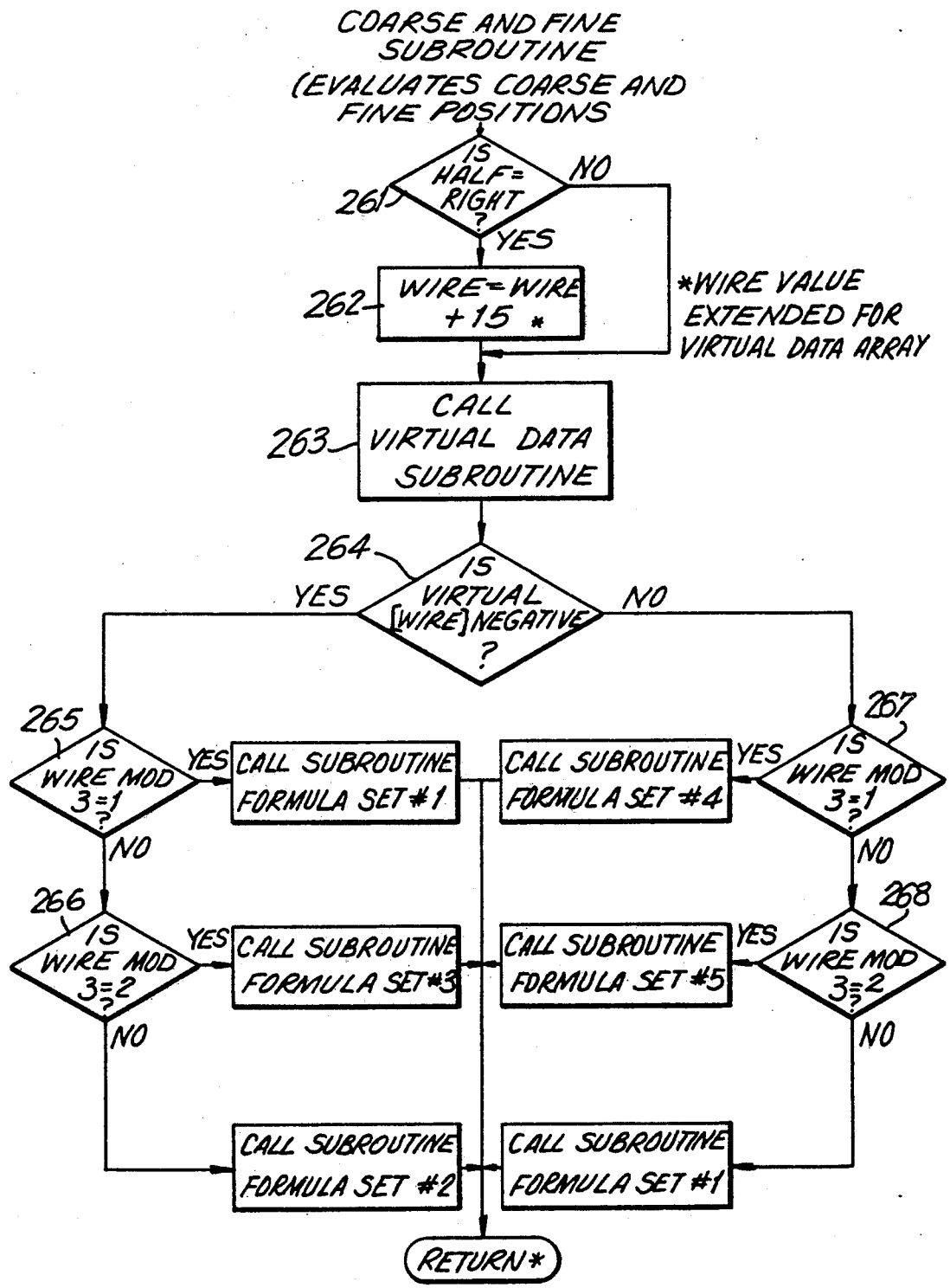

FIG. 11F illustrates the coarse and fine subroutine which determines which of the FORMULA SET #s 1-5 should be called in order to calculate the fine position of the pointing device. The first three blocks 261-263 map the actual array with 15 locations into the 30 positions of the virtual array and at that time a test 264 is carried out to determine whether the value in the array is negative. Depending upon the answer to that question determines whether the program branches to blocks 265 and 266, which call FORMULA SET #1, #3 or #2, or to the right branch of blocks 267 and 268 which call FORMULA SET #4, #5 or #1. The expression indicated in each of the test blocks 265-268 when evaluated will produce a number corresponding to one of the 60 coarse positions which as indicated above where the FORMULA SET #s 1-5 are set out in detail indicate which FORMULA SET is used for which coarse position.

Figure 11G:
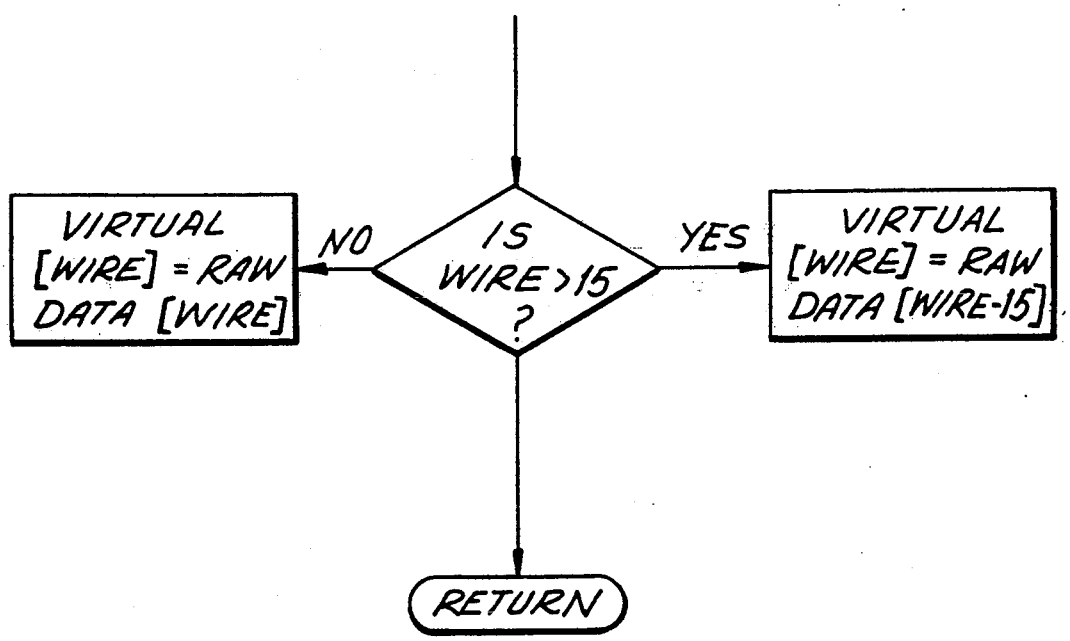

FIG. 11G is the subroutine for the mapping of the actual array to the virtual array and is self-evident from the description so far given. That subroutine is called before the time the test is carried out in block 264 of FIG. 11F.

It should be understood that while the software described in detail is preferred for carrying out the invention, the invention is not limited thereto and those people skilled in this art will be able to recognize that there exists other software routines and algorithms that can be used to achieve the same results as the one illustrated in FIGS. 11A–11G.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A digitizer tablet having a conductor array under an active tablet area and a pointing device, the combination when energized with the pointing device over the conductor array generating electrical signals representative of the pointing device location over the array with respect to at least one tablet coordinate,
   said conductor array comprising a plurality of individual elongated conductors capable of selective excitation or selective signal detection, each conductor comprising a plurality of sections each including at least three active parallel conductor portions, spaced from one another and distributed under the active tablet area,
   means serially interconnecting the active parallel conductor portions of each conductor such that the current flowing in any one of the parallel conductor portions is the same as in any other parallel conductor portion, and
   means selectively connectable to each conductor such that excitation or induced currents flow simultaneously in all its parallel portions.

2. The digitizer tablet of claim 1, wherein the parallel conductor portions of each section are laid out in a horizontal block-S pattern comprising a middle conductor portion in series with outer parallel conductor portions, thereby to define at least two tablet coarse positions per parallel conductor portion.

3. The digitizer tablet of claim 2, wherein the direction of current flow in the outer portions is the same but opposite to that of the middle portion.

4. The digitizer tablet of claim 3, wherein each two of the plurality of sections are located in different segments of the active tablet area.

5. An electromagnetic digitizer tablet having a conductor array under an active tablet area and a pointing device having an inductor, the combination when energized with the pointing device over the conductor array will generate electrical signals representative of the pointing device location over the array with respect to at least one tablet coordinate,
   said conductor array comprising a plurality of individual conductors capable of selective excitation or selective scanning, each conductor comprising p equally-spaced, parallel, active portions where p is at least equal to 3, said p active portions comprising a common middle portion in series with at least left and right outer portions such that any current carried by the common portion is the same as in the outer portions but flows in opposition to that of the adjacent outer portions,
   said pointing device having an inductive coil of a diameter that is less than the spacing between the common portion and each of the outer portions,
   means for connecting separately and selectively to each individual conductor a circuit for passing current therethrough or for detecting current induced therein such that for each unit of current passing through the common portion, the same unit current passes through each of the outer portions,
   first means for detecting the polarity and magnitude of the signal induced in each individual conductor or in the inductive coil when each individual conductor is excited,
   second means for determining from the detected signal polarity whether the pointing device is over the space between the common portion and the left or right outer portion.

6. The digitizer of claim 5, wherein each individual conductor comprises first and second interconnected spaced sections each comprising a common middle portion and left and right outer sections, and further comprising third means for determining whether the inductive coil is over the first or the second section of each conductor.

7. The digitizer of claim 6, wherein the third means comprises an additional individual conductor encompassing both the first and second conductor sections.

8. The digitizer of claim 7, further comprising means for determining from the magnitude of the induced signals a coarse location of the pointing device with respect to the conductor array.

9. The digitizer of claim 8, further comprising means for determining from the magnitude of the induced signals in adjacent conductors a fine location of the pointing device with respect to the conductor array.

10. A method of determining pointing device location over a digitizer tablet having a conductor system comprising N conductors distributed throughout the active area of the tablet, said tablet active area being divided up into R segments, said conductors having an active portion located in each segment and defining 2RN coarse positions, said tablet and pointing device when energized cooperating to generate electrical signals whose magnitude and polarity are indicative of the pointing device location, comprising the steps:
   (a) determining the conductor energized when the maximum (MAX) signal is generated;
   (b) determining a coarse position from the determination made in step (a);
   (c) when the coarse position determined in step (b) corresponds to at least one first predetermined set of coarse positions which contains less than all the coarse positions, determining the fine position of the pointing device by a first calculation involving signal magnitudes associated with conductors adjacent to the conductor determined in step (a);

(d) when the coarse position determined in step (b) does not correspond to said first set of coarse positions, determining the fine position of the pointing device by a second calculation different from said first calculation.

11. The method of claim 10, wherein the members of said first set of coarse positions differ in number by a factor of 3R.

12. The method of claim 11, Wherein the members of said second set of coarse positions also differ in number by a factor of 3R.

13. The method of claim 10, further comprising:

(e) providing a look-up table mapping coarse positions to at least the conductor determined in step (a), and using the look-up table in step (b) to determine coarse position.

14. The method of claim 13, wherein the look-up table comprises a first array having a location for each of the N conductors, said array being indexed by the number of the conductor determined in step (a).

15. The method of claim 14, wherein the look-up table is mapped into a second virtual array having two locations containing the same value as that of each location of the first array and being indexed by the number of the conductor determined in step (a) and twice that number, and determining which half of the array to use based on the polarity of the MAX signal.

16. The method of claim 10, wherein N=15 and R=2.

17. The method of claim 10, wherein the 2RN coarse positions divide up into m sets of n conductors each with the same fine calculation used for each of the coarse positions in each set.

18. The method of claim 17, wherein N=15, R=2, m=6, and n=10.

19. The method of claim 18, wherein five distinct fine calculations are employed for six sets of coarse positions, two of said six sets using the same fine calculation.

20. The method of claim 19, wherein at least one of the fine calculations use sums of signal magnitudes on adjacent conductors, and at least one other of the fine calculations uses differences of signal magnitudes in adjacent conductors.

21. An electromagnetic digitizer tablet having a conductor array under an active tablet area and a pointing device having an inductor, the combination when energized with the pointing device over the conductor array will generate electrical signals representative of the pointing device location over the array with respect to at least one tablet coordinate, said conductor array comprising a plurality of identical, individual, elongated conductors capable of selective excitation or selective signal detection, each array conductor comprising at least first and second segments spaced apart by a first distance, each segment comprising at least three active parallel conductor portions spaced apart from one another by a second distance and the first and second segments extending respectively under first and second spaced regions of the active tablet area, said second distance being substantially smaller than said first distance, each of the first and second conductor segments being laid out in a horizontal pattern and comprising a middle conductor portion in series with outer parallel conductor portions, thereby to define at least two tablet coarse positions per first and second conductor segment, means interconnecting the active parallel conductor portions of each array conductor such that the current flowing in any one of the parallel conductor portions is the same as or an integer multiple of that in any other parallel conductor portion, all of the conductors' first segments forming a first group in a regular order and all of the conductors' second segments forming a second group in the same regular order and spaced from the first group such that the electrical signals generated when the pointing device is over the portion of the first segment to the left, respectively, right side of the middle active conductor portion of each array conductor will be substantially the same in polarity and magnitude as the electrical signals generated when the pointing device is over the portion of the second segment to the right, respectively, left side of the middle active conductor portion of the same array conductor, means selectively connectable to each array conductor such that excitation or induced currents flow simultaneously in all its parallel portions.

22. The digitizer tablet of claim 21, further comprising means for determining when the pointing device is over the first or over the second segment of each array conductor.

23. The digitizer tablet of claim 22, wherein the means for determining comprises an additional conductor.

24. The digitizer tablet of claim 22 wherein each array conductor comprises only two segments, and the first and second tablet area regions correspond respectively to the left and right halves of the active tablet area.

25. The digitizer tablet of claim 24, wherein the first group extends under the left half of the active tablet area and the second group extends under the right half of the active tablet area.

26. The digitizer tablet of claim 25, wherein each array conductor first and second segment defines at least one tablet coarse position.

27. The digitizer tablet of claim 26, wherein each array conductor first and second segment defines two tablet coarse positions.

28. An electromagnetic digitizer tablet having a conductor array under an active tablet area and a pointing device having an inductor, the combination when energized with the pointing device over the conductor array will generate electrical signals representative of the pointing device location over the array with respect to at least one tablet coordinate, said conductor array comprising a plurality of identical, individual, elongated conductors capable of selective excitation or selective signal detection, each array conductor comprising at least first and second segments spaced apart by a first distance, each segment comprising at least three active parallel conductor portions spaced apart from one another a second smaller distance and the first and second segments extending respectively under first and second spaced regions of the active tablet area, the conductor segments of each array conductor having the same geometry such that the terminals of the array conductors lie adjacent the same side of the tablet without any self-crossing conductor portions, each of the first and second conductor segments being laid out in a horizontal pattern and comprising a middle conductor portion in series with outer parallel conductor portions, thereby to define at least two tablet coarse positions per first and second conductor segment, means interconnecting the active parallel conductor portions of each array conductor such that the current flowing in anyone of the parallel conductor portions is the same as or an integer multiple of that in any other parallel conductor portion, all of the conductors' first segments forming a first group in a regular order and all of the conductors' second segments forming a second group in the same regular order and spaced from the first group, whereby the electrical signals generated when the pointing device is over the portion of the first segment to the left, respectively, right side of the middle active conductor portion of each array conductor will be substantially the same as the electrical signals generated when the pointing device is over the portion of the second segment to the right, respectively, left side of the middle active conductor portion of the same array conductor, means selectively connectable to each array conductor such that excitation or induced currents flow simultaneously in all its parallel portions, means for determining when the pointing device is over the first or over the second segment of each array conductor.

29. An electromagnetic digitizer tablet having a conductor array under an active tablet area and a pointing device having an inductor, the combination when energized with the pointing device over the conductor array will generate electrical signals representative of the pointing device location over the array with respect to at least one tablet coordinate, said conductor array comprising a plurality of identical, individual, elongated conductors capable of selective excitation or selective signal detection, each array conductor comprising at least first and second segments spaced apart by a first distance, each segment comprising at least middle and outer active parallel conductor portions spaced apart from one another by a second distance and the first and second segments extending respectively under first and second spaced regions of the active tablet area, said second distance being substantially smaller than said first distance, means interconnecting the active parallel conductor portions of each array conductor such that the current flowing in any one of the parallel conductor portions is the same as or an integer multiple of that in any other parallel conductor portion, all of the conductors' first segments forming a first group in a regular order and all of the conductors' second segments forming a second group in the same regular order and spaced from the first group such that the electrical signals generated when the pointing device is over the portion of the first segment to the left, respectively, right side of the middle active conductor portion of each array conductor will be substantially the same in polarity and magnitude as the electrical signals generated when the pointing device is over the portion of the second segment to the right, respectively, left side of the middle active conductor portion of the same array conductor, means selectively connectable to each array conductor such that excitation or induced currents flow simultaneously in all its parallel portions.

means for determining when the pointing device is over the first or over the second segment of each array conductor, said means for determining comprising an additional conductor having a middle conductor connected to two outer conductors and extending under the entire active tablet area.

* * * * *